United States Patent
Dick et al.

(10) Patent No.: US 11,001,283 B2
(45) Date of Patent: May 11, 2021

(54) SYSTEMS AND METHODS FOR VISUALIZING AND ANALYZING A RAIL SURFACE

(71) Applicant: ENSCO, INC., Springfield, VA (US)

(72) Inventors: Matthew Dick, Charlottesville, VA (US); Zhipeng Liu, Fairfax, VA (US); Samson Yilma, Arlington, VA (US)

(73) Assignee: ENSCO, INC., Springfield, VA (US)

( * ) Notice: Subject to any disclaimer, the term of this patent is extended or adjusted under 35 U.S.C. 154(b) by 0 days.

(21) Appl. No.: 16/632,656

(22) PCT Filed: Jul. 27, 2018

(86) PCT No.: PCT/US2018/044212
§ 371 (c)(1),
(2) Date: Jan. 21, 2020

(87) PCT Pub. No.: WO2019/023658
PCT Pub. Date: Jan. 31, 2019

(65) Prior Publication Data
US 2020/0164904 A1  May 28, 2020

Related U.S. Application Data

(60) Provisional application No. 62/538,894, filed on Jul. 31, 2017, provisional application No. 62/538,531, filed on Jul. 28, 2017.

(51) Int. Cl.
*B61L 23/04* (2006.01)
*B61K 9/10* (2006.01)
(Continued)

(52) U.S. Cl.
CPC ............ *B61L 23/044* (2013.01); *B61K 9/10* (2013.01); *G01N 21/8851* (2013.01);
(Continued)

(58) Field of Classification Search
CPC .................. B61L 23/044; G01N 21/8851
See application file for complete search history.

(56) References Cited

U.S. PATENT DOCUMENTS

2014/0277824 A1* 9/2014 Kernwein ............... B61K 9/08
701/1
2017/0106885 A1* 4/2017 Singh ..................... G01B 11/22

FOREIGN PATENT DOCUMENTS

EP         3 138 753 A1     3/2017
WO    WO 2014/163864 A1   10/2014

OTHER PUBLICATIONS

Mermec Group, "Head Check—Head Check Detection," Web page <http://www.mermecgroup.com/inspect/track-inpsection/64/head-check.php>, retrieved from Internet on Jul. 7, 2020 (2 pages).
(Continued)

*Primary Examiner* — Girumsew Wendmagegn
(74) *Attorney, Agent, or Firm* — Nixon Peabody LLP

(57) ABSTRACT

A system for analyzing a railroad track comprises a transport device, a camera coupled to the transport device, an electronic display device, a memory device, and one or more processors. The camera is disposed adjacent to a rail of the railroad track and generates image data reproducible as one or more images of at least a portion of a surface of the rail. The processors can produce an image of the rail surface, which includes a plurality of elongated portions. The image is analyzed to identify any defects that exist within each elongated portion of the rail surface. The processors determine a value of a metric for each elongated portion of the rail surface. The metric is associated with the identified defects. The electronic display device displays a graph indicative of the metric for each elongated portion, the image of the rail surface, or both.

20 Claims, 9 Drawing Sheets

(51) Int. Cl.
  *G01N 21/88* (2006.01)
  *G01N 21/95* (2006.01)
  *H04N 5/225* (2006.01)
  *H04N 5/232* (2006.01)
  *H04N 5/247* (2006.01)

(52) U.S. Cl.
  CPC ........... *G01N 21/95* (2013.01); *H04N 5/2256* (2013.01); *H04N 5/232* (2013.01); *H04N 5/247* (2013.01)

(56) References Cited

OTHER PUBLICATIONS

Mermec Group, "Track Inspection—V-Cube," Web page <http://www.mermecgroup.com/inspect/track-inspection/524/track-inspection-v-cube.php>, retrieved from Internet on Jul. 7, 2020 (2 pages).
Mermec Group, "Fishplate/Joint Bar Inspection," Web page <http://www.mermecgroup.com/inspect/track-inspection/65/fishplate--joint-bar.php>, retrieved from Internet on Jul. 7, 2020 (2 pages).
Mermec Group, "Internal Rail Flaw—Ultrasonic Inspection," Web page <http://www.mermecgroup.com/inspect/track-inspection/1020/internal-rail-flaw.php>, retrieved from Internet on Jul. 7, 2020 (2 pages).
KLD Labs, "Rail Surface Evaluation," Web page <http://www.kldlabs.com/?page_id=63>, 2018, retrieved from Internet on Jul. 7, 2020 (2 pages).
KLD Labs, "Rail Profile Measurement," Web page, <http://www.kldlabs.com/?page_id=64>, 2018, retrieved from Internet on Jul. 7, 2020 (2 pages).
KLD Labs, "Third Rail Monitoring," Web page <http://www.kldlabs.com/?page_id=67>, 2018, retrieved from Internet on Jul. 7, 2020 (2 pages).
KLD Labs, "Rail Grinding Assessment," Web page <http://www.kldlabs.com/?page_id=130>, 2018, retrieved from Internet on Jul. 7, 2020 (2 pages).
International Search Report and Written Opinion in International Application No. PCT/US2018/044212, dated Nov. 19, 2018 (12 pages).

\* cited by examiner

SYSTEMS AND METHODS FOR VISUALIZING AND ANALYZING A RAIL SURFACE

CROSS-REFERENCE TO RELATED APPLICATIONS

This application claims priority to and the benefit of U.S. Provisional Patent Application No. 62/538,894, filed Jul. 31, 2017, and U.S. Provisional Patent Application No. 62/538,531, filed Jul. 28, 2017, each of which is hereby incorporated by reference herein in its entirety.

TECHNICAL FIELD

The present disclosure relates to rail inspection systems, and more particularly, to systems and methods for visualizing and analyzing a rail surface.

BACKGROUND

Some prior practices categorize rail surface damage using pre-defined grades, which can be subjective and can fail to represent the detailed measurement accurately. Other prior practices report overall summary statistics over particular sections of the track, which fails to illustrate the detailed distribution of rail surface damage along the track on a foot-by-foot basis. The present disclosure is directed to solving these problems and addressing other needs.

SUMMARY

A system for visualizing and quantifying surface damage of a railroad track comprises a transport device configured to travel along the railroad track; a camera coupled to the transport device such that the camera is (i) disposed adjacent to a rail of the railroad track and (ii) configured to generate image data reproducible as an image of at least a portion of a surface of the rail; an electronic display device; a memory device configured to receive and store therein the generated image data; and one or more processors configured to: produce, based on the image data, an image of the surface of the rail, the surface of the rail in the image including a plurality of elongated portions; analyze the image to identify one or more defects within each of the plurality of elongated portions of the surface of the rail; determine a value of at least one metric for each of the plurality of elongated portions of the surface of the rail, the at least one metric being associated with the identified one or more defects within each of the plurality of elongated portions of the surface of the rail; and cause the electronic display device to display (i) the image of the surface of the rail, (ii) a graph indicative of the at least one metric for each of the plurality of elongated portions of the surface of the rail, or both (i) and (ii).

A method for visualizing and quantifying surface damage of a railroad track comprises generating, via a camera disposed adjacent to a rail of the railroad track, image data; producing, based on the generated image data, an image of a surface of the rail, the surface of the rail in the image including a plurality of elongated portions; analyzing the image to identify one or more defects within each of the plurality of elongated portions of the surface of the rail; determining a value of at least one metric for each of the plurality of elongated portions of the surface of the rail, the at least one metric being associated with the identified one or more defects within each of the plurality of elongated portions of the surface of the rail; and causing an electronic display device to display (i) the image of the surface of the first rail, (ii) a graph indicative of the at least one metric for each of the plurality of elongated portions of the surface of the rail, or both (i) and (ii).

A system for visualizing and quantifying surface damage of a railroad track comprises a transport device configured to travel along the railroad track; a first camera coupled to the transport device such that the first camera is (i) disposed adjacent to a first rail of the railroad track and (ii) configured to generate first image data reproducible as a first image of a portion of a surface of the first rail; a second camera coupled to the transport device such that the second camera is (i) disposed adjacent to a second rail of the railroad track and (ii) configured to generate second image data reproducible as a second image of a portion of a surface of the second rail; an electronic display device; a memory device configured to receive and store therein the generated first image data and the generated second image data; and one or more processors configured to: divide the first image of the portion of the surface of the first rail into a first plurality of regions; divide the second image of the portion of the surface of the second rail into a second plurality of regions; analyze the divided first image to identify, within each of the first plurality of regions, one or more defects in the portion of the surface of the first rail; analyze the divided second image to identify, within each of the second plurality of regions, one or more defects in the portion of the surface of the second rail; determine information associated with the identified one or more defects in the portion of the surface of the first rail and the identified one or more defects in the portion of the surface of the second rail; and cause the electronic display device to display (i) at least a portion of the first image, (ii) at least a portion of the second image, (iii) the determined information associated with the identified one or more defects in the portion of the surface of the first rail, (iv) the determined information associated with the identified one or more defects in the portion of the surface of the second rail, or (v) any combination of (i), (ii), (iii), or (iv).

A system for visualizing and quantifying surface damage of a railroad track comprises a transport device configured to travel along the railroad track; a camera coupled to the transport device such that the camera is (i) disposed adjacent to a rail of the railroad track and (ii) configured to generate image data reproducible as an image of a surface of the rail; an electronic display device; a memory device configured to receive and store therein the generated image data; and one or more processors configured to: produce, based on the image data, a plurality of first images, each of the plurality of first images being of a respective elongated portion of the surface of the rail; analyze the plurality of first images to identify one or more defects in the surface of the rail within each of the elongated portions of the surface of the rail; determine a value of at least one metric for each of the elongated portions of the surface of the rail, the at least one metric being associated with the identified one or more defects in the surface of the rail within each respective one of the elongated portions of the surface of the rail; and cause the electronic display device to display (i) a second image including each of the elongated portions of the surface of the rail and (ii) a graph indicative of the at least one metric for each of the elongated portions of the surface of the rail.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
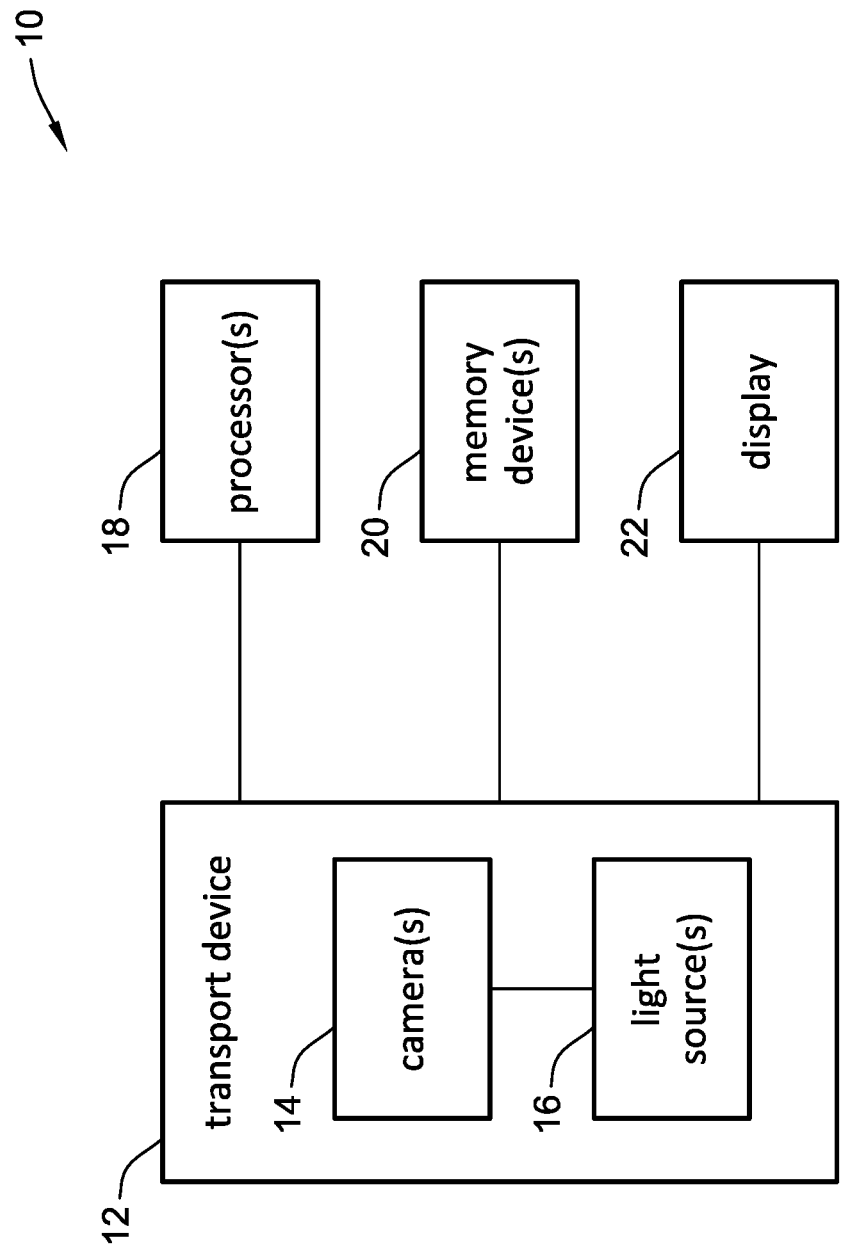
FIG. 1 is a block diagram of the components of a system for visualizing and analyzing a rail surface.

While the present disclosure is susceptible to various modifications and alternative forms, specific implementations and embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring now to FIG. 1, a system 10 for visualizing and quantifying surface damage on a railroad track includes a transport device 12, one or more cameras 14, one or more light sources 16, one or more processors 18, one or more memory devices 20, and an electronic display device 22. The transport device 12 is configured to travel along the track. The cameras 14 and the light sources 16 are coupled to the transport device 12 and are aimed at the surface of the rails of the railroad track. The light sources 16 illuminate the surface of the rails while the cameras 14 generate image data that is reproducible as images of the surface of the rails.

The one or more memory devices 20 are coupled to the one or more cameras 14, and can receive and store the image data that is generated by the cameras 14. The one or more processors 18 are coupled to the memory devices 20 and are used to analyze the image data generated by the cameras 14. In some implementations, the processors 18, the memory devices 20, or both are located in the transport device 12. In other implementations, one or both of the processor 18 and the memory devices 20 are located external to the transport device 12. In still other implementations, the processors 18 and the memory devices 20 can be located in the transport device 12, and any of the images or data captured or produced by the system 10 can be transmitted to other processors and/or memory devices located external to the transport device 12.

The analysis of the surfaces of the rails as discussed herein can take place in the transport device 12, external to the transport device 12, or both. For example, the processors 18 and memory devices 20 in the transport device 12 can perform the analysis, and communicate the analysis to an external device or location, such as a hard drive, a mobile device, a tablet computer, a laptop computer, a desktop computer, an Internet-connected storage device, etc. In some implementations, the analysis is communicated to an external source that is located within a vehicle traveling alongside the transport device 12 as the transport device 12 travels along the railroad track. In other implementations, the processors 18 and memory device on the transport device 12 immediately communicate the data to the external device or location without performing the analysis, which can then be performed by the external device or at the external location.

As is discussed in more detail herein, the processors 18 are configured to produce images of the surface of the rail and analyze the images to identify defects in the surface of the rail. The processors 18 can then determine a variety of information associated with the defects. This information can be damage metrics that are used to quantify the condition of the surface of the rails. In some implementations, the images are produced and analyzed in real-time as the transport device 12 travels along the tracks. In other implementations, the images are produced and analyzed after the transport device 12 has traveled along the length of the track.

It should be understood that defect generally refers to any type of damage, mark, or other feature that may occur to or be located on the surface of the rail, such as cracks, pitting, etc., whether or not the defects require the rails to be repaired or replaced. Rather, the defects are used to calculate various metrics that indicate the condition of the rail, which can be used to determine whether the rails need to be repaired or replaced. Other types of metrics can also be calculated and used. The processors 18 can also determine a variety of information about properties of the rails themselves, including structural properties or the identification of grinding marks.

In some implementations, the cameras 14 are triggered to generate image data by rotation of the wheels of the transport device 12. As the transport device 12 moves along the tracks and the wheels rotates, the cameras 14 can continuously generate image data of the surface of the rails. In some implementations, if the transport 12 device stops for any reasons, the cameras 14 pause so they do not generate image data while the transport device 12 is stopped. This prevents redundant image data from being generated. The cameras 14 can be line-scan cameras, frame cameras, photodiodes, photomultiplier tube arrays, charge-coupled devices (CCDs), etc. The light sources 16 can be any light source that is able to illuminate the portion of the surface of the rail that the cameras 14 are currently aimed at. The light sources 16 can include fluorescent bulbs, incandescent bulbs, light emitting diodes (LEDs), arc lamps, flashtubes, etc.

While the system 10 is generally used to analyze the surfaces of railroad tracks, the system 10 can be used to analyze any type of track upon which a vehicle can travel. For example, the system 10 could be used with subway tracks, elevated train tracks, high speed rail tracks, monorail tracks, tram tracks, etc. The system 10 can also be adapted to work with tracks having any number of rails. While reference is generally made herein to a railroad track having left and right rails, the system 10 can be used to analyze single-rail tracks, or tracks with two or more rails.

Figure 2A:
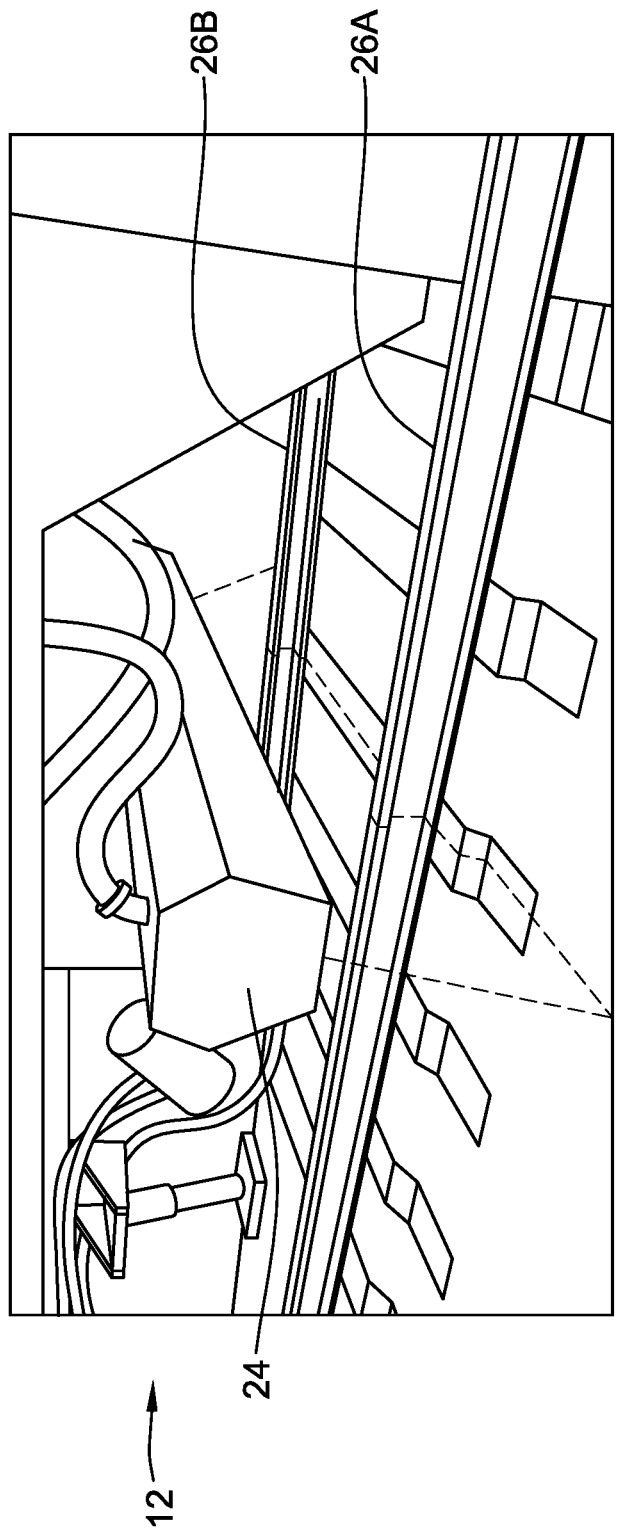
FIG. 2A is a perspective view of a first implementation of the system of FIG. 1.
Figure 2B:
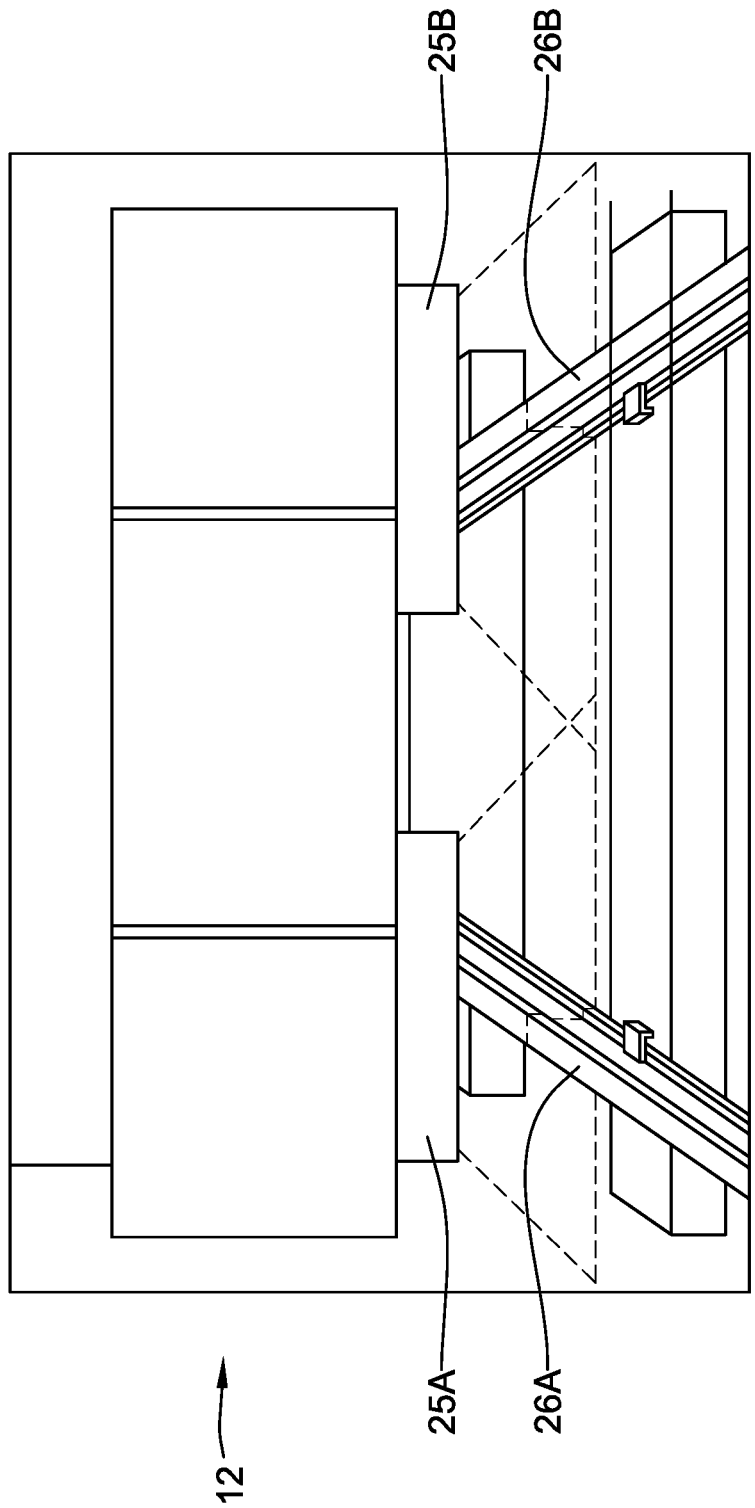
FIG. 2B is an end view of a second implementation of the system of FIG. 1.

As shown in FIG. 2A and FIG. 2B, the cameras and the light sources can be mounted to the underside of the transport device 12 so that the cameras and light sources are disposed above the rails. The cameras and the light sources can be positioned within a housing 24 (FIG. 2A) or housing portions 25A and 25B (FIG. 2B) to protect them during use. The cameras and the light sources point downward toward the left rail 26A and the right rail 26B. The cameras and the light sources aimed at rail 26A are all generally aimed at the same location along the surface of rail 26A. Similarly, the cameras and the light sources aimed at right rail 26B are all generally aimed at the same location along the surface of rail 26B. The light sources thus illuminate the surface of the rails 26A, 26B as the cameras generate image data that can be reproduced as images of the surfaces of the rails 26A, 26B.

Any number of different types of vehicles can be used as the transport device 12. For example, the transport 12 device may be a truck that is configured to move along the railroad track. The transport device 12 could also be a train car. These vehicles could be standard trucks or train cars, or could be specially modified to travel along the track. Generally, any device that can be configured to move along the railroad track can be used as the transport device 12.

Figure 3A:
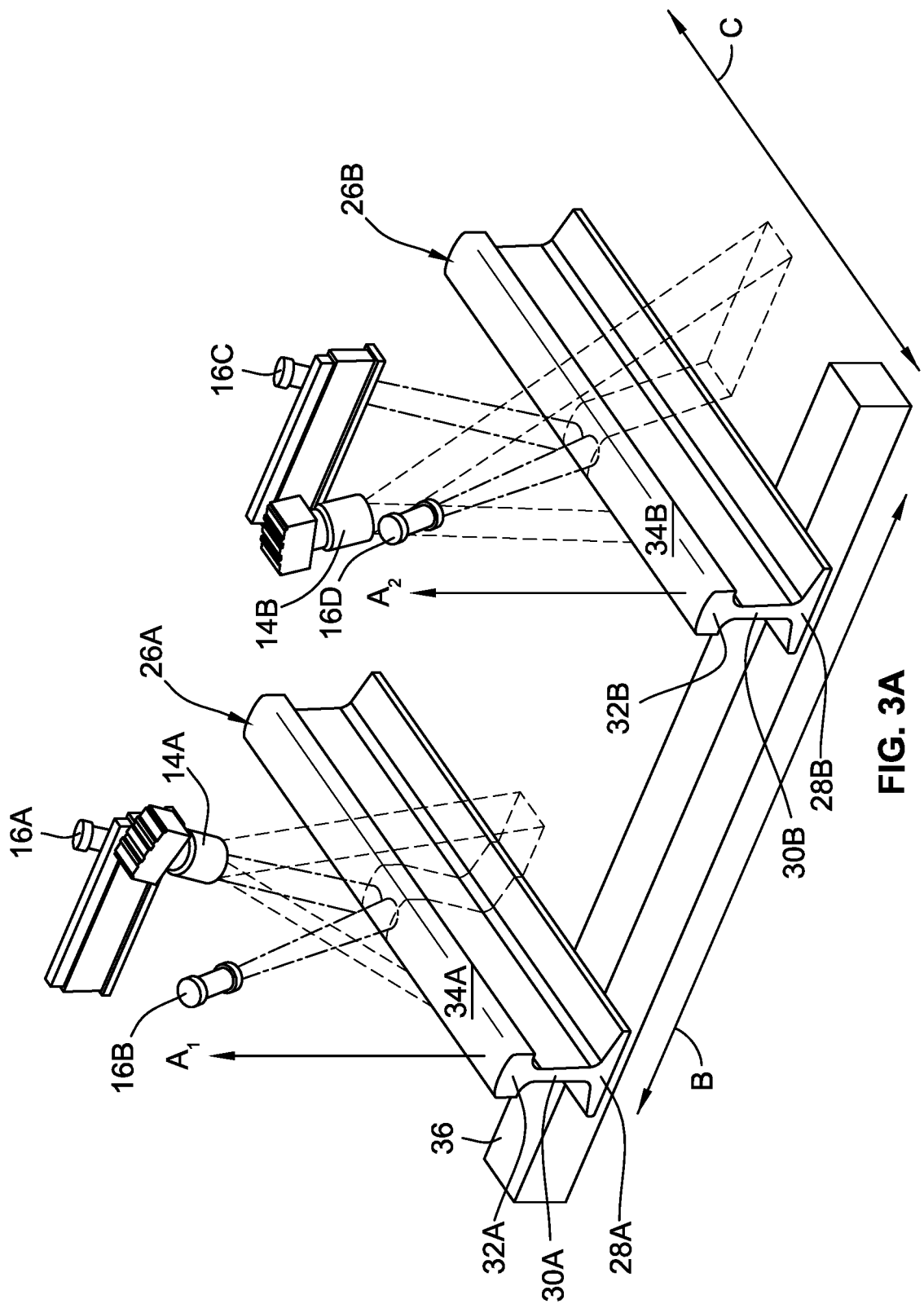
FIG. 3A is a partial perspective view of cameras and light sources of the system of FIG. 1 aimed at two rails.
Figure 3C:
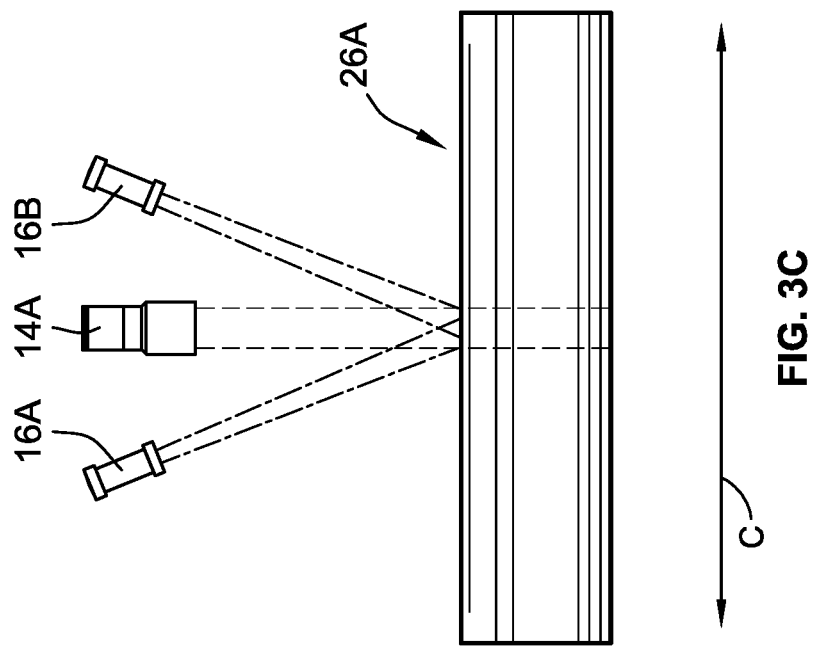
FIG. 3C is a partial side view of the cameras and light sources of FIG. 3A.
Figure 3B:
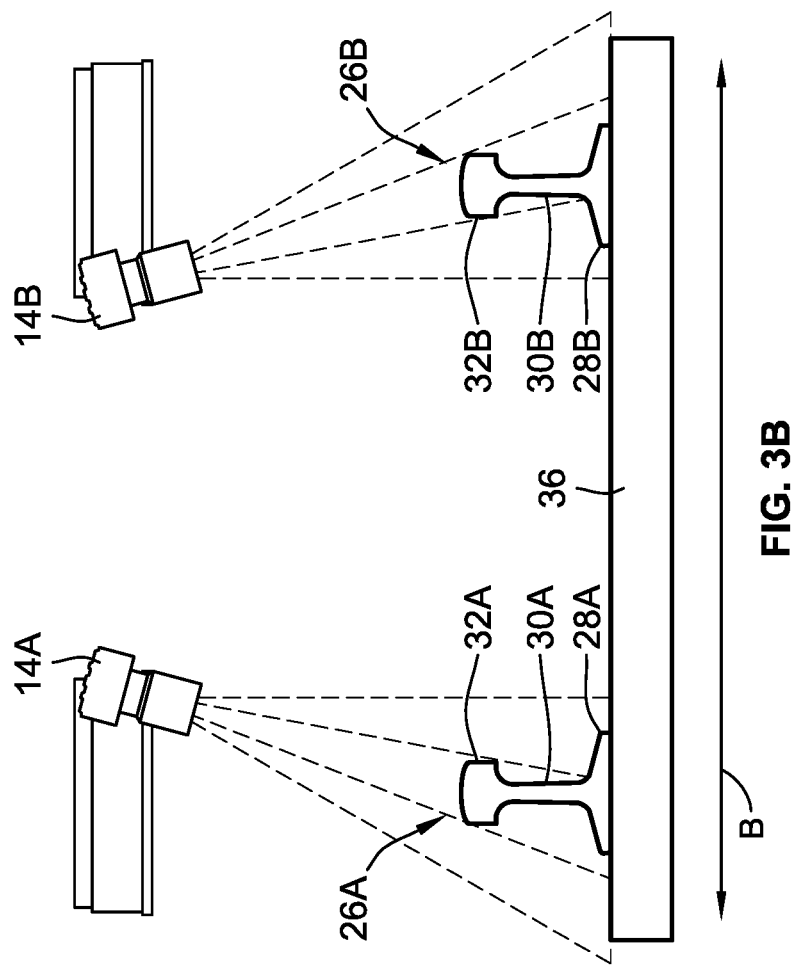
FIG. 3B is a partial end view of the cameras and light sources of FIG. 3A.

Referring now to FIGS. 3A-3C, the one or more cameras generally includes a first camera 14A and a second camera 14B coupled to the transport device. The first camera 14A is mounted above the left rail 26A of the rail track. The second camera 14B is mounted above the right rail 26B of the rail track. Each rail 26A, 26B comprises a rail base 28A and 28B, a rail web 30A and 30B, and a rail head 32A and 32B. The rail base 28A, 28B of each rail 26A, 26B rests on one or more crossties 36, which generally span at least the distance between the rails 26A, 26B. When the transport device travels along the rails 26A, 26B, the wheels of the transport device rest on surfaces 34A and 34B of the rail heads 32A, 32B. The rail head surfaces 34A, 34B of each rail 26A, 26B are both generally curved along the width of the rail head surfaces 34A, 34B to form a slight arch with respect to the ground. However, in some implementations, the rail head surfaces 34A, 34B are flat.

Camera 14A is generally aimed only at rail 26A, while camera 14B is generally aimed only at rail 26B. However, some implementations one or more of the cameras could be aimed at multiple rails. Each camera 14A, 14B is spaced apart from its respective rail 26A, 26B along a respective vertical axis $A_1$ and $A_2$. These axes extend upwards from the rail head surfaces 34A, 34B of rails 26A, 26B respectively. Axes $A_1$ and $A_2$ are also each generally perpendicular to the rail head surfaces 34A, 34B. However, because the rail head surfaces 34A, 34B can be curved, axes $A_1$ and $A_2$ may not be perpendicular to the rail head surfaces 34A, 34B at every point along the rail head surfaces 34A, 34B. However, axes $A_1$ and $A_2$ are generally perpendicular at least to the center of the rail head surfaces 34A, 34B. Furthermore, while axes $A_1$ and $A_2$ are referred to as vertical axes for ease of understanding, depending on the layout of the track and its relation to the ground, axes $A_1$ and $A_2$ may not always be completely vertical.

Axes $A_1$ and $A_2$ are also each generally perpendicular to both a transverse axis B (which extends between and connects the rails 26A, 26B) and a longitudinal axis C (which extends along the length of the rails 26A, 26B). As best shown in FIG. 3B, cameras 14A and 14B are generally mounted inwardly relative to rails 26A and 26B, respectively. In this manner, camera 14A is further spaced apart from rail 26A along the second axis B towards rail 26B. Similarly, camera 14B is further spaced apart from rail 26B along the second axis B towards rail 26A. Cameras 14A and 14B are thus positioned at angles $\theta_1$ and $\theta_2$ relative to axes $A_1$ and $A_2$, respectively. In some implementations, angles $\theta_1$ and $\theta_2$ can be between about 0.1° and about 20°, between about 5.0° and about 12.0°, or about 5.0°. Both of the cameras 14A and 14B can be mounted at the same angle relative to their respective vertical axes $A_1$ and $A_2$, or they could each be mounted at different angles relative to axes $A_1$ and $A_2$. In some implementations, one or both of cameras 14A, 14B could be mounted at an angle of 0° relative to their respective vertical axes $A_1$ and $A_2$, e.g., the cameras 14A, 14B could be mounted directly over the rail head surfaces 34A, 34B.

Regardless of the angle $\theta_1$, $\theta_2$ at which cameras 14A, 14B are disposed at relative to the vertical axis, cameras 14A, 14B are generally always aimed at the rail head surfaces 34A and 34B. Thus, camera 14A and 14B are not always aimed directly downward with respect to where they are coupled to transport device at, e.g., parallel to axes $A_1$ and $A_2$ respectively. Rather, cameras 14A and 14B are generally aimed outward towards rails 26A, 26B respectively. Camera 14A is thus aimed at an angle back towards rail head surface 34A, while camera 14B is aimed at angle back towards rail head surface 34B. These angles are generally equal to angles $\theta_1$ and $\theta_2$, respectively. However, in some implementations, these angles are different from angles $\theta_1$ and $\theta_2$, respectively.

The camera 14A, 14B are generally positioned inwardly and aimed outwardly with respect to rails 26A and 26B to ensure that the images that are produced from the generated image data clearly show the inner areas of the rail head surfaces 34A, 34B closer the inner edges of rails 26A, 26B. Most vehicles that travel along tracks, such as a train car traveling along a railroad track, have wheels with inner flanges that extend downward along the inner side of the rails 26A, 26B. As a result, there is generally more contact between the wheels and the inner areas of the rail head surfaces 34A, 34B that are closer to the inner edges of the rails 26A, 26B. These inner areas of the rail head surfaces 34A, 34B can be damaged more easily, and thus it is important to produce images that fully show these inner areas. Because the rail head surfaces 34A, 34B can be slightly arched with respect to the ground, the areas of the rail head surfaces 34A, 34B closest to the inner edges of the rails 26A, 26B curve away from cameras mounted directly overhead. By angling the camera 14A, 14B inwardly and aiming them outwardly, the images that are produced fully capture the areas of the rail head surfaces 34A, 34B nearest the inner edges of the rails 26A, 26B.

FIGS. 3A-3C also illustrate the arrangement of the one or more light sources relative to the rail head surfaces 34A, 34B. Each light source is configured to aid in illuminating the portion of the rail head surface 34A, 34B that one of the cameras is aimed at. As shown, the one or more light sources can include first and second light sources 16A and 16B that illuminate the rail head surface 34A of rail 26A. The one or more light sources further include third and fourth light sources 16C and 16D that illuminate the rail head surface 34B of rail 26B. The first and second lights sources 16A and 16B are spaced apart from rail 26A along axis $A_1$, while third and fourth light sources 16C and 16D are spaced apart from rail 26B along axis $A_2$. In some implementations, the light sources 16A-16D are disposed at about the same vertical position as their respective cameras 14A, 14B. In other implementations however, the light sources 16A-16D are disposed nearer to or further away from the rail head surfaces 34A, 34B as compared to cameras 14A, 14B.

Unlike cameras 14A and 14B however, light sources 16A-16D are generally not spaced apart from the rail along axis B. As such, the light sources 16A-16D are generally not angled inwardly or outwardly with respect to rails 26A, 26B. However, light sources 16A-16D are spaced apart along axis C from the portion of the rail head surfaces 34A, 34B that light sources 16A-16D are illuminating. Light sources 16A-16D are thus aimed at an angle toward rail head surfaces 34A, 34B. As best shown in FIG. 3C, light sources 16A and 16B are spaced apart along the length of rail 26A from the portion of the rail head surface 34A that they are illuminating. In this manner, light source 16A is spaced apart in a first direction along axis C, while light source 16B is spaced apart in a second direction along axis C opposite the first direction. The light sources 16A and 16B are thus disposed at angles relative to axis $A_1$. Light sources 16A, 16B are also aimed back towards rail head surface 34A at corresponding angles.

While not shown in FIG. 3C, light sources 16C and 16D are arranged similarly. The light sources 16C and 16D are spaced apart in opposite directions along axis C from the portion of rail head surface 34B that they are illuminating. As such, light sources 16C and 16D are also disposed at angles relative to axis $A_2$, and aimed back towards rail head surface 34B at corresponding angles. In some implementations, one or more of the light sources 16A-16D are disposed at an angle of about 13°. In other implementations, these angles are between about 10° and about 15°, between about 5° and about 20°, or between about 0° and about 30°.

In some implementations, light sources 16A and 16B are disposed at different angles relative to axis $A_1$, and light sources 16C and 16D are disposed at different angles relative to axis $A_2$. The sum of the angles at which light sources 16A and 16B are disposed can be less than about 60.0°, between about 20° and about 30°, between about 10° and about 40°, or about 26.0°. In some implementations, light sources 16C and 16D are disposed in a similar arrangement as light sources 16A and 16B. In other implementations, light sources 16C and 16D can be disposed in a different arrangement than light sources 16A and 16B.

Other implementations can have any number or arrangement of lights and cameras. For example, some implementations include a single camera with a field of view wide enough to image all the rails of the track. Other implementations could include multiple cameras per rail. Still other implementations could modify the angle at which the cameras are positioned relative to the rail. For example, some implementations could have the cameras mounted directly above the rails and aimed straight down, or mounted outwardly from the rails and aimed inwardly. Implementations including multiple cameras per rail could have each camera for a rail disposed between the rails, or could have one camera disposed at an inward angle, one camera disposed directly above the rails, one camera disposed at an outward angle, etc. In other implementations, all of the cameras can be mounted at aimed at its own respective angle, which may be the same or different as the angle in one or more of the other cameras.

Some implementations include only a single light source per rail. Other implementations could include a single light source that illuminates both rails. The light sources can have a focused beam of light that has a width approximately equal to the width of the rail head surfaces. In other implementations, the width of the beam of light produced by the light sources is wider than the width of the rail head surfaces.

Similar to the cameras, each light source can be mounted and aimed at an angle that can be the same or different from the angle of each of the other light sources.

Figure 4A:
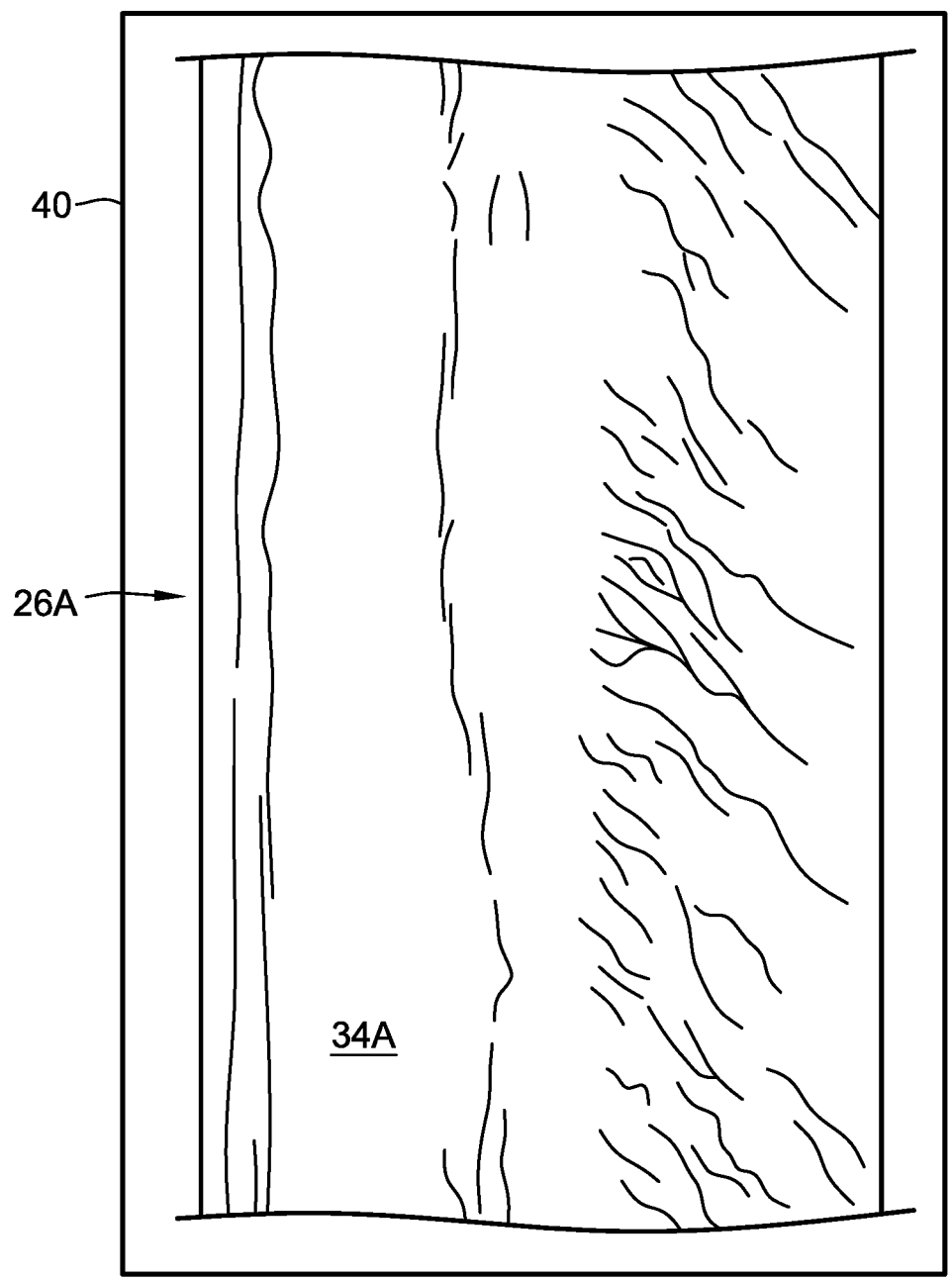
FIG. 4A is an image of a portion of a rail surface generated by the system of FIG. 1.
Figure 4B:
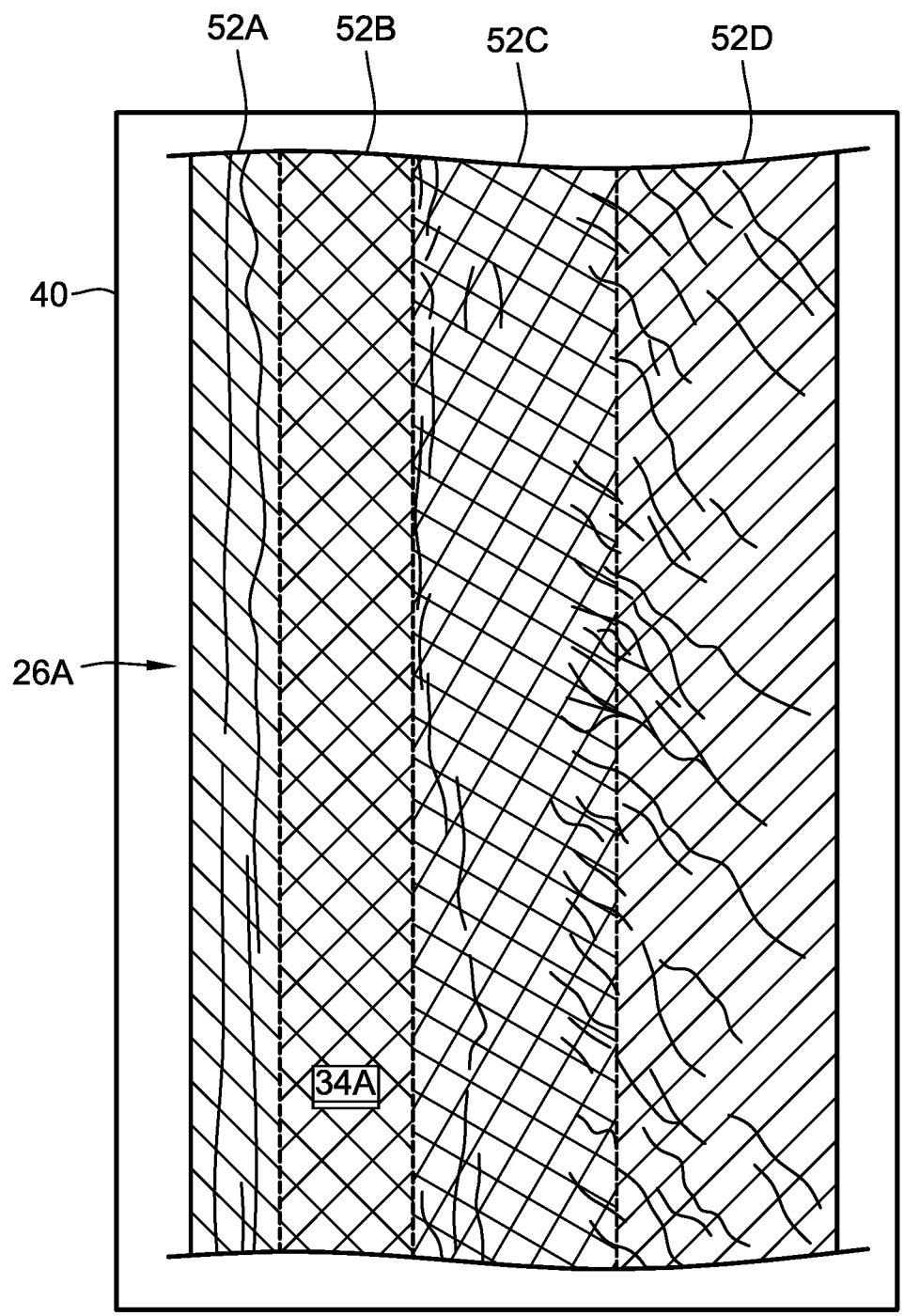
FIG. 4B is an image of the portion of the rail surface of FIG. 4A divided into a plurality of regions.

Referring now to FIG. 4A and FIG. 4B, as the transport device travels along the rail and generates image data, the processors of the system can generate one or more images of the rail head surfaces 34A, 34B. In some implementations, a single image of both rail head surfaces 34A, 34B is produced. In other implementations, a first image is produced that shows rail head surface 34A, and a second image is produced that shows rail head surface 34B. In implementations analyzing tracks with more than two rails, a single image can be produced that shows all of the rails, or multiple images that show one or more rails can be produced. In other implementations, the image or images may be of discrete elongated portions of the rail head surfaces 34A, 34B along the longitudinal direction (e.g., the length) of the rail. In the implementation of FIG. 4A, the image 40 is of a single discrete elongated portion of rail head surface 34A. Generally, any number of images 40 can be produced showing some or all portions of one or more of the rails of the track.

Once the image or images of the rail head surfaces 34A, 34B are produced, each discrete elongated portion along the length of the rail head surfaces 34A, 34B can be analyzed individually. Each discrete elongated portion of the rail head surfaces 34A, 34B that is analyzed has a length equal to a unit length l. Each rail 26A, 26B of a track being analyzed that has a total length L will thus have a number of discrete elongated portions equal to L/l. In some implementations, the unit length l is about one foot. In other implementations, the unit length l is between about one half foot and about two feet. Generally, the unit length l can be modified as needed for the current application of the system.

Image 40 of the rail head surface 34A can show a variety of different defects that are present in the single discrete elongated portion of the rail head surface 34A. These defects can include cracks, pitting defects, grinding marks, etc. The processors of the system are configured to analyze the image 40 and detect the edges of the rail head surface 34A using computer vision techniques. In some implementations the processors also determine which edge is the inner edge and which edge is the outer edge. In other implementations, it is known prior to the analysis which edge is the inner edge and which edge is the outer edge. After the edges of the rail head surface 34A are identified, the width of the portion of the rail head surface 34A can be measured. The width of the rail head surface 34A is generally equal to the distance between the inner edge and the outer edge of rail head surface 34A.

After the width of the rail head surface 34A has been determined, the processors of the system are configured to divide the discrete elongated portion of the rail head surface 34A in the image 40 that is being analyzed to create a divided image 50, as shown in FIG. 4B. In the divided image 50, the discrete elongated portion of rail head surface 34A has been divided into one or more regions 52A-52D for analysis purposes. As shown, the portion of the rail head surface 34A is divided into regions 52A-52D along the width of the rail head surface 34A. Each region 52A-52D has a width that is generally less than the total width of the rail head surface 34A in the image 40. Each region 52A-52D also has a length that is generally equal to the unit length l of the discrete elongated portion of the rail head surface 34A. By dividing the image of the rail head surface 34A into the plurality of regions 52A-52D, the system can determine information about each region 52A-52D of the rail head surface 34A. As is discussed herein, this information can include a number of metrics, including damage metrics related to defects in the rail head surface 34A.

Divided image 50 shows the rail head surface 34A that has been divided into a first region 52A, a second region 52B, a third region 52C, and a fourth region 52D. Each of these regions 52A-52D has a width that is less than the width of the rail head surface 34A in divided image 50. The percentage width of each of the regions 52A-52D in the divided image 50 of the rail head surface 34A generally corresponds with the widths of physical areas of the rail head surface 34A itself. For example, when viewing the rail head surface 34A, the inner n % of the width of the rail head surface 34A may be the area where a large portion of the contact between the wheel and the rail head surface 34A occurs. As such, this area may be the most important area for analysis purposes. Generally, the inner n % of rail head surface 34A in the image 40 of the rail head surface (and thus the area that would form inner region 52D in the divided image 50) would correspond to the inner n % of the actual rail head surface 34A. Thus, the inner n % of the rail head surface 34A in the image 40 can be designated as the fourth region 52D in the divided image 50.

The correspondence between areas of the rail head surface 34A of the actual rail 26A and areas of the rail head surface 34A in the image 40 is generally dependent upon the angle of the cameras relative to their respective vertical axes. For example, if the camera is directly above the rail 26A, the inner n % of the rail head surface 34A will generally correspond to the inner n % of the rail head surface 34A in the image 40. However, when the camera is disposed at angle relative to the rail 26A (and thus closer to the inner edge of the rail head surface 34A than to the outer edge of the rail head surface 34A), the inner n % of the rail head surface 34A may occupy a larger portion of the field of view of the camera. The resulting image 40 that can be produced of the rail head surface 34A may be skewed, in that the inner n % of the rail head surface 34A appears to occupy a percentage of the width of the rail head surface 34A in the image 40 that is larger than n %. This is because the inner n % of the rail head surface 34A is closer to the camera. Similarly, the outer areas of the rail head surface 34A may appear to occupy a correspondingly smaller percentage of the rail head surface 34A in the image 40 than they actually do, because the outer areas of the rail head surface 34A are further away from the camera. As such, the percentage width that is used to divide image 40 and obtain image 50 may need to be adjusted to take into account the angle at which the camera is disposed.

In the implementation of FIG. 4B, the first region 52A (e.g. the outer region) has a width of about 40% of the width of the rail head surface 34A in the image 40. The second region 52B and the third region 52C can each have a width of about 20%. The fourth region 52D (e.g., the inner region) can have a width of about 40%.

Generally, areas closer to the inner edge of the rail head surface 34A will be assigned to regions having a smaller width than areas closer to the outer edge of the rail head surface 34A. This allows the inner areas of the rail head surface 34A (e.g., areas that experience more contact with the wheel of the vehicle traveling along the rail 26A) to be analyzed in finer detail. In some implementations, the area of the region nearest the inner edge of the rail head surface 34A can have a width as a percentage of the width of the rail head surface 34A that is between about 5.0% and about 35.0%, between about 10.0% and about 30.0%, about 20.0%, less than about 20.0%, or less than about 50.0%. The area of the outer region can have a width as a percentage of the width of the rail head surface 34A that is between about 30.0% and about 50.0%, between about 40.0% and about 60.0%, about 40.0%, about 50.0%, or about 60.0%. The width of the regions between the inner and outer regions can have a width as a percentage of the width of the rail head surface 34A that is between about 5.0% and about 35.0%, between about 10.0% and about 30.0%, about 20.0%, or less than about 20.0%.

Generally, the one or more regions of the rail head surface 34A in the divided image 50 can have any desired width or configuration. For example, the rail head surface 34A may be divided into more or less than four regions. The regions can all have equal widths, some of the regions may have equal widths while some of the regions have different widths, or all of the regions can have different widths. In some implementations, the rail head surface 34A in the image 40 is not divided into multiple regions at all. Instead, the processors analyze the whole width of the rail head surface 34A without dividing the rail head surface 34A into multiple regions.

In other implementations, the one or more regions of the rail head surface 34A in the divided image 50 include an outer region nearest the outer edge of the rail head surface that has a width of about 50.0% of the width of the rail head surface 34A. The remaining width of the rail head surface 34A can be divided into two or more other regions, each having a width that is less than about 50.0% of the width of the rail head surface 34A. In still other implementations, any of the regions of the rail head surface 34A can generally have any width, so long as no region has a width that is smaller than the width of the inner region nearest the inner edge of the rail head surface 34A.

In other implementations, one of the regions may overlap with some or all of the other regions. For example, the width of the rail head surface 34A can be divided into n−1 regions, each having a width that is less than the full width of the rail head surface 34A in the image 40. An $n^{th}$ region of the rail head surface 34A can also be identified that has a width equal to the width of the rail head surface 34A in the image 40, and thus overlaps with all of the other regions of the rail head surface in the divided image 50. Thus, in the implementation shown in FIGS. 4A and 4B, the system could identify a fifth region that spans the entire width of the rail head surface 34A in the image 40 and overlaps with each of the regions 52A-52D.

The overlapping region could also overlap with fewer than all of the other regions. For example, the one or more regions could include an inner region, an outer region, one or more interior regions positioned between the inner region and the outer region, and an overlapping region. The overlapping region could overlap with either (i) the inner region and the one or more interior regions, or (ii) the one or more interior regions and the outer region. And in some implementations, the overlapping region overlaps only with a portion of the width of one or more other regions, instead of the entire width of the region.

As noted above, in some implementations, the system produces a single image 40 that includes the entire length of both the rail head surfaces 34A, 34B. The rail head surfaces 34A, 34B in the single image 40 can be divided into regions along the width of the rail head surfaces 34A, 34B to create the divided image 50. The single divided image 50 thus includes the entire length of both the rail head surfaces 34A, 34B divided into a plurality of regions. Each discrete elongated portion of the rail head surfaces 34A, 34B in the single divided image 50 can be analyzed separately. In other implementations, individual images 40 are produced of one or more discrete elongated portions of rail head surfaces 34A, 34B. The rail head surfaces 34A, 34B in the individual images 40 can be divided to create individual images 50.

Regardless of how the image 40 of the rail head surface 34A is divided to obtain the divided image 50, defects in the rail head surface 34A can be identified within the regions 52A-52D of the divided image 50. These identified defects can be used to determine information about the regions 52A-52D. The defects that can be identified include cracks, pitting defects (which may be depressions defined in the rail head surface 34A), grinding marks (marks left by rail grinding machines used to perform maintenance on the rails), flaking or spalling (pieces of surface material detaching from the rail head surface 34A), or other defects. The processors can analyze these defects to determine a number of different properties of the defects and metrics related to the rail head surface 34A.

For example, the divided image 50 can be analyzed to determine the size of the defects. For cracks identified in the portion of the rail head surface 34A, a number of properties of the cracks can be identified, such as the length of the cracks, the width of the cracks, or an angle of the cracks relative to a reference axis. In some implementations, the angle of the cracks is relative to transverse axis B of FIGS. 4A and 4B, e.g., the axis extending between the left rail 26A and the right rail 26B. In other implementations, the angle of the cracks is relative to longitudinal axis C of FIGS. 4A and 4C, e.g., the axis extending along the length of the rails 26A, 26B. From the detected length and width of the cracks, the system can determine the area of each crack identified in the rail head surface 34A. Similarly, the system can analyze identified pitting defects or other identified defects to determine the area of those defects.

To identify defects such as cracks, a spatial filter is first applied to the divided image 50 of the rail head surface 34A. The spatial filters can include edge-related filters and center-surround box filters to identify potential cracks and other damage areas. Next, the cumulative distribution of the response values of all of the applied filters is used to identify potential areas in the divided image 50 for further processing. A connected-component analysis and further filtering is applied to these identified areas to identify the defects. The further filtering can be based on known properties of potential defects, e.g., minimum or maximum major axis length or aspect ratio.

The system is also configured to identify and filter out grinding marks on the rail head surface 34A. Grinding marks are generally not indicative of damage to the rail head surface 34A that requires repair or replacement. By filtering out the grinding marks identified on the rail head surface 34A, the system ensures that the grinding marks do not contribute to the metrics that are calculated. For example, if the grinding marks are not filtered out by the system, the metrics may indicate that the rail head surface 34A has more damage than it actually does. This could lead to unnecessary and expensive repairs. Similarly, the presence of the grinding marks could also skew the metrics in the opposite direction, such that the metrics indicate that the rail head surface 34A has less damage than it actually does.

After (i) identifying defects within each region of the divided image 50 of the rail head surface 34A and (ii) determining a number of properties related to the identified defects, the system can calculate a number of different metrics for each region 52A-52D of the portion of the rail head surface 34A. The metrics can thus be calculated for regions that have a width less than the width of the rail head surface 34A and do not overlap with any other regions, regions that have a width less than the width of the rail head surface 34A and do overlap with some or all of one or more other regions, regions that have a width equal to the width of the rail head surface 34A and overlap with all of the other regions, or any other region in the divided image 50.

A first metric that the system can calculate is the crack density within a region. The crack density is defined as the area of all cracks identified in the region divided by the area of the region. Thus, to determine the crack density of the region, the system first identifies all cracks in the rail head surface 34A within the region. Next, the system determines the area of each of cracks identified within the region. The area of each of the cracks is added together to determine a total crack area within the region. By then taking the ratio of (i) the total crack area within the region (e.g., the sum of each of the cracks identified within the region) to (ii) the area of the region, the crack density of the region is determined. The units of the crack density metric can be a percentage between 0 and 100, or a dimensionless value between 0 and 1.

A second metric that the system can calculate is the average crack angle within a region. The average crack angle is calculated by first determining the angle of every crack identified within the region with respect to the reference axis. The angle of each identified crack is then added together, and the result is divided by the total number of cracks identified within the region. This gives the average crack angle within the region. The units of the average crack angle metric can be degrees, radians, or any other unit suitable angular unit.

A third metric that the system can calculate is the average crack width of a region. The average crack width of the region is determined by adding the width of each crack identified in the rail head surface within the region, and dividing that sum by the number of cracks identified in the rail head surface 34A within the region. The average crack width metric can have units of millimeters or any other suitable unit of distance.

A fourth metric that the system can calculate is the pitting density of a region. The pitting density of a region is determined in a similar fashion as the crack density of a region. First, the system determines the area of each of the pitting defects identified within the region. The area of each of the pitting defects is added together to determine the total pitting defect area within the region. By then taking the ratio of (i) the total pitting defect area within the region (e.g., the sum of each of the pitting defects identified within the region) to (ii) the area of the region, the pitting defect density of the region is determined. Similar to the crack density metric, the units of the pitting defect density metric can be a percentage between 0 and 100, or a dimensionless value between 0 and 1.

A fifth metric that the system can calculate is the surface damage density of a region. The surface damage density of a region is calculated in a similar fashion of the crack density or the pitting defect density. However, instead of limiting the metric to only cracks or only pitting defects, the system determines the area of any type of defect identified within the region, including cracks, pitting defects, and all other types of defects. The area of each of the defects is added together to determine the total defect area within the region. By then taking the ratio of (i) the total defect area within the region to (ii) the area of the region, the surface damage density of the region is calculated. Similar to the crack density metric and the pitting defect density metric, the units of the surface damage density metric can be a percentage between 0 and 100, or a dimensionless value between 0 and 1.

A sixth metric that the system can calculate is known as a surface region index. Multiple types of surface region index metrics can be calculated. A first type of surface region index is the weighted average of multiple metrics for the same region. In one example, the system could assign weights to each of (i) the crack density metric of a first region, (ii) the average crack angle metric of the first region, (iii) the average crack width metric of the first region, and (iv) the surface damage density metric of the first region. The resulting weighted values can be added together to obtain the surface region index for the region. Generally, any combination of any metrics can be used to calculate the first type of surface region index metric.

The first type of surface region index can be calculated for any of the individual regions that the image of the portion of the rail head surface 34A may be divided into. This includes regions that have a width less than the width of the rail head surface 34A and do not overlap with any other regions, regions that have a width less than the width of the rail head surface 34A and do overlap with some or all of one or more other regions, regions that have a width equal to the width of the rail head surface 34A and overlap with all of the other regions, or any other region.

With this first type of surface region index, different metrics may be assigned different weights depending on which region of the portion of the rail head surface 34A is being analyzed. Some metrics may be more important in different regions of the rail head surface 34A depending on what type of damage is indicated by what metric. For example, when looking at the inner region of the rail head surface 34A, the crack density metric may be more determinative of whether the rail 26A (or at least the inner region of the rail head surface 34A) needs to be repaired or replaced than the average crack angle metric. Thus, when calculating the first type of surface region index for this inner region, the crack density metric can be given a higher weight than the average crack angle metric. This first type of surface region index is generally dimensionless A second type of surface region index metric is a weighted sum of the same metric for multiple regions of the portion of the rail head surface 34A. For example, the system can determine the average crack width of each region in an image, assign a weight to the average crack width metric for each region, and then add the weighted average crack width metrics. As with the first type of surface region index, the weighting of the individual components can be adjusted based on the metric being used and the individual regions. The value of a given metric may be more indicative of whether the rail needs to be repaired or replaced when it is determined for an inner region (where more of the contact between the wheel and the rail head surface 34A occurs) than other regions. This second type of surface region index is also generally dimensionless.

A third type of surface region index that can be calculated is the weighted sum of different metrics for different regions. For example, the third type of surface region index could be the weighted sum of (i) the crack density of a first region, (ii) the average crack angle of a second region, (iii) the average crack width of a third region, and (iv) the surface damage density of a fourth region. Generally, any of the metrics can be used for any of the different regions, and can be weighted in any combination. This third type or surface region index is also generally dimensionless. For any of the three types of surface region indices, the different metrics and regions can be weighted in various different combinations. Generally, depending on the rail system being analyzed and the preferences of the user, any metric can be given any weight in any region.

Any of the metrics can also be modified and/or combined in various ways to reveal different information about the rail head surface 34A. For example, instead of calculating the average crack angle metric and average crack width metric for a given region, the system could calculate the average crack angle in the region for any cracks that have a width larger than a pre-defined threshold.

All of the above-described metrics can be calculated for each discrete elongated portion of the rail head surface 34A, 34B having a unit length 1, and for each rail 26A, 26B of the track. Thus, for a system that analyzes a total length L of a track that includes two rails 26A, 26B, the system can produce images of L/l discrete elongated portions of the rail head surfaces 34A, 34B of each rail 26A, 26B, for a total of 2*L/l images. If each discrete elongated portion of the rail head surfaces 34A, 34B is divided into n regions (which can include non-overlapping and overlapping regions, as well as the entire width as a region) and m metrics are calculated for each region, the total number of individual metrics that are calculated is equal to 2*n*m*L/l. For a system that analyzes a track having r number of rails, a total of r*n*m*L/l metrics can be calculated. In addition, the metrics could also include a grinding mark indicator showing the presence or absence grinding marks. Generally, a single grinding mark indicator can be determined or calculated for each rail, resulting in a total of (r*n*m*L/l)+r metrics.

Figure 5:
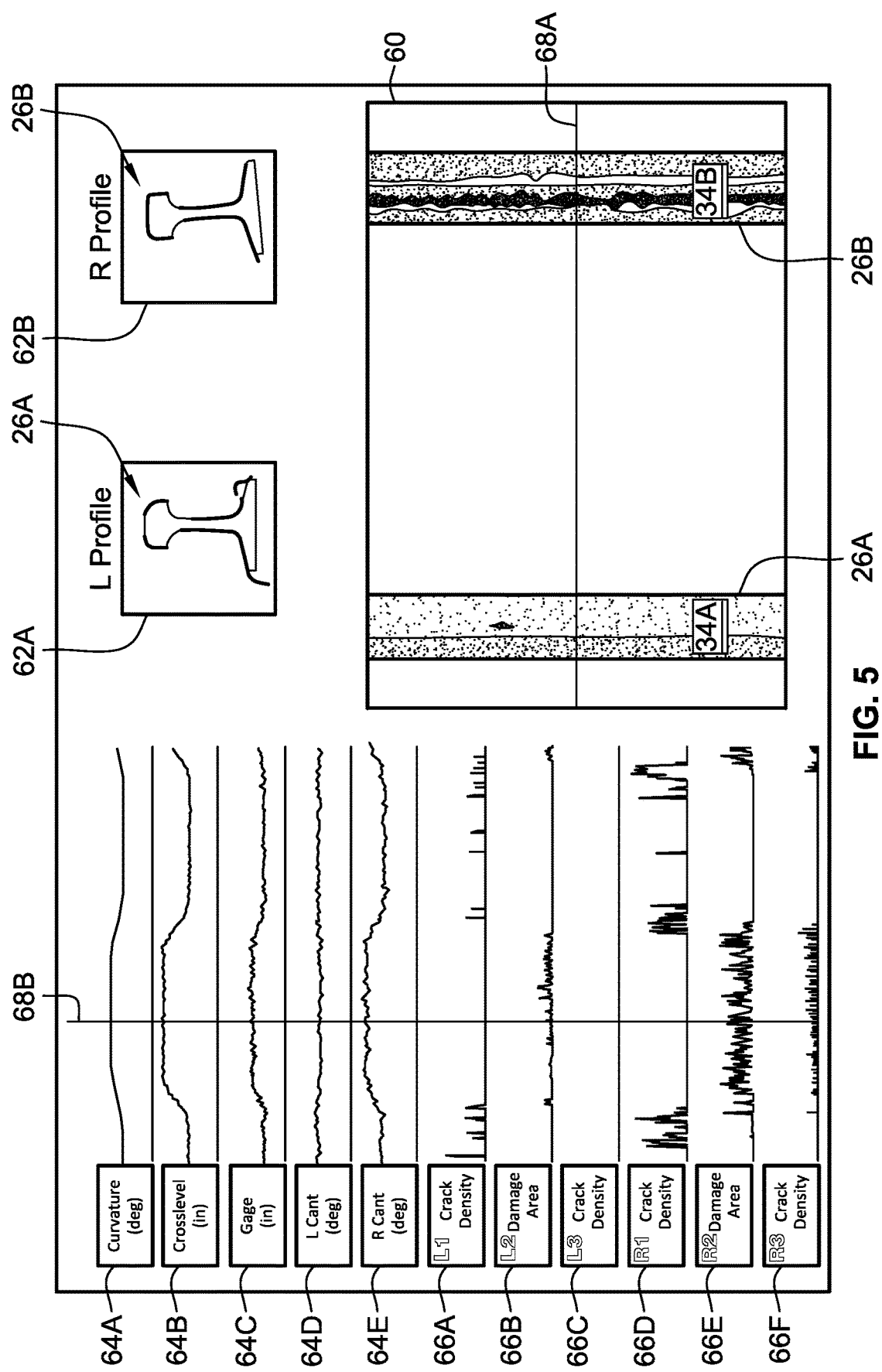
FIG. 5 is an image of an electronic display device displaying an image of the surfaces of two rails, cross-sectional images of the two rails, and graphs of information related to the two rails.

Referring now to FIG. 5, the electronic display device 22 can display an image 60 that includes one or both of the rail head surfaces 34A, 34B, along with a variety of other information. In some implementations, image 60 shows only rail head surface 34A, and is generally equivalent to image 40 discussed herein. In other implementations, image 60 shows both rail head surfaces 34A and 34B, and is generally equivalent to an image 40 of the rail head surface 34A and another image 40 of the rail head surface 34B. In other implementations, image 60 is different from other produced images 40 that show the rail head surfaces 34A, 34B. In other implementations, the electronic display device 22 displays only the image 60 of one or both of rail head surfaces 34A, 34B. In still other implementations, the electronic display device 22 displays only information about the rails 26A, 26B and the rail head surfaces 34A, 34B. As discussed herein, this information can be graphs that show the value of the calculated damage metrics along the entire length of the rail head surfaces 34A, 34B.

In the implementation of FIG. 5, image 60 shows rail head surface 34A and rail head surface 34B. Image 60 generally shows a single discrete elongated portion of both rail head surfaces 34A and 34B, as well as any defects within in the rail head surfaces 34A, 34B within the single discrete elongated portion. The defects in the rail head surfaces 34A, 34B are generally visible to the user, allowing the user to visually analyze the rail head surfaces 34A, 34B. While the image 60 in FIG. 5 shows both rail head surface 34A and rail head surface 34B, image 60 can generally include some or all of the rails of a multi-rail system, or the only rail of a single-rail system. Furthermore, in some implementations, image 60 shows multiple discrete elongated portions of the rail head surfaces 34A, 34B.

The electronic display device 22 can also display cross sectional-images the rails in a vertical plane. For example, the electronic display device 22 displays cross-sectional image 62A of rail 26A. and cross-sectional image 62B of rail 26B. Each of the cross-sectional images 62A, 62B are taken at a cross-section located at a certain point along the length of the rails 26A, 26B. These cross-sectional images 62A and 62B, or rail profile images, show the rail base 28A and 28B, the rail web 30A and 30B, and the rail head 32A and 32B at a given location along the length of the rails 26A, 26B.

The cross-sectional images 62A, 62B can be obtained by system 10 using cameras 14A, 14B, or could be obtained by a separate imaging system. The cross-sectional images 62A, 62B illustrate features of the rails 26A, 26B, such as the angle each rail 26A, 26B is tilted at relative to the ground. This feature of the rails 26A, 26B is known as the cant. The cross-sectional images 26A, 26B can also show the degree to which the rails 26A, 26B have been worn away as compared to a new rail. The electronic display device 22 can display one or both cross-sectional images 62A, 62B alone, or in combination with one or both of the image 60 of the rail head surfaces 34A, 34B and the information about the rails 26A, 26B and the rail head surfaces 34A, 34B.

The electronic display device 22 can display graphs 64A-64E of a variety of different properties of the rails 26A, 26B. These properties could be structural properties related to the size, orientation, etc. of the rails, or other properties. Each graph 64A-64E plots the value of a given property against length of the rails 26A, 26B. Graph 64A shows the curvature of the rails 26A, 26B. The curvature of the rails 26A, 26B is determined by forming a reference chord that connects two points along a curve of rails 26A, 26B. Two radii are formed between the center of the curve of the rails 26A, 26B, and the respective endpoints of the reference chord. The angle between the two radii is defined as the curvature of the rails 26A, 26B.

Graph 64B shows the crosslevel of the rails 26A, 26B. The crosslevel of the rails 26A, 26B is the elevation difference between the rail head 32A of rail 26A and the rail head 32B of rail 26B. Graph 64C shows the gage of the rails 26A, 26B. The gage of the rails 26A, 26B is the horizontal distance between the inner edge of rail 26A and the inner edge of rail 26B. Graph 64D shows the cant of rail 26A. Graph 64E shows the cant of rail 26B. Generally, the electronic display device 22 can display any number of graphs that show properties of the rails 26A, 26B.

The graphs of the properties of the rail can also include graphs of whether grinding marks are present in rail head surfaces 34A, 34B. In some implementations, these graphs are a binary indicator of whether grinding marks are present. In these implementations, the value of the graph for every location along the length of the rail head surfaces 34A, 34B is generally a high value (indicating the presence of grinding marks) or a low value (indicating the absence of grinding marks). In some implementations, a high value could indicate the absence of grinding marks, while a low value could indicate the presence of grinding marks. In still other implementations, the value of the graphs of the grinding marks can be on a continuous scale that can indicate the severity of the grinding marks. The properties of rails 26A, 26B, including the structural properties and grinding marks, can be determined by system 10, or could be determined by one or more other separate systems.

The electronic display device 22 can also display graphs 66A-66F of the metrics that are calculated for the different regions defined in the images 40 of the rail head surfaces 26A, 26B. Graph 66A shows the value of the crack density metric in the first region of rail 26A, e.g., the left rail. Graph 66B shows the value of the surface damage density metric in the second region of the left rail 26A. Graph 66C shows the value of the crack density metric in the third region of the left rail 26A. Graph 66D shows the value of the crack density metric in the first region of the right rail 26B. Graph 66E shows the value of the surface damage density metric in the second region of the right rail 26B. Finally, graph 66D shows the value of the crack density metric in the third region of the right rail 26B. The electronic display device can display any number of graphs that show the calculated metrics of different regions of the rails 26A, 26B.

All of the graphs 64A-64E and 66A-66F can have a common x-axis that corresponds to a location along the length of the rail head surfaces 34A, 34B. For the graphs 66A-66F that show the calculated metrics, each data point corresponds to the value of a metric for a single discrete elongated portion of the rail head surfaces 34A, 34B. In some implementations though, the rail properties are measured at individual locations along the length of the rail head surfaces 34A, 34B, and not for discrete elongated portions of the rail head surfaces 34A, 34B. And oftentimes, the rail properties are measured at multiple locations that fall within a single discrete elongated portion of the rail head surfaces 34A, 34B giving rise to a single value of the calculated metrics.

Thus, a data point in one of the graphs 64A-64E of the rail properties at a single discrete point on the x-axis corresponds to the value of that property at the location along the length of the rail head surfaces 34A, 34B that the single discrete point on the x-axis represents. The data point in one of the graphs 66A-66F of the calculated metrics at that same single discrete point on the x-axis corresponds to the value of that calculated metric for a discrete elongated portion of the rail head surfaces 34A, 34B that includes the location that the single discrete point on the x-axis represents. That location could be located at the beginning of the respective discrete elongated portion of the rail head surfaces 34A, 34B, at the end of the respective discrete elongated portion of the rail head surfaces 34A, 34B, the middle of the respective discrete elongated portion of the rail head surfaces 34A, 34B, or at any other location within the respective discrete elongated portion of the rail head surfaces 34A, 34B, including the beginning or end of the respective discrete elongated portion of the rail head surfaces 34A, 34B.

In some implementations, the rail properties could be measured for a discrete elongated portion of the rail head surfaces 34A, 34B. Similarly, some metrics related to the defects are measured at individual locations along the rail head surfaces 34A, 34B. Generally, any property, characteristic, or metric related to the rails 26A and 26B—whether it is measured at individual locations along the length of the rail head surfaces 34A, 34B or for a discrete elongated portion—can be displayed by the electronic display device 22 and have a common x-axis with any other property, characteristic, or metric displayed by the electronic display device 22.

The electronic display device 22 can further display one or more visual markers that link a location along the length of the rail head surfaces 34A, 34B displayed in image 60 with (i) the value of all the rail properties of graphs 64A-64-E at that same location, and (ii) the value of all of calculated metrics of graphs 66A-66F for a respective discrete elongated portion of the rail head surfaces 34A, 34B that includes that same location.

In the implementation of FIG. 5, the one or more visual markers include a horizontal marker 68A and a vertical marker 68B. The horizontal marker 68A can overlaid at a specific location along one or both of rail head surfaces 34A, 34B in image 60. The vertical marker 68B is overlaid on some or all of the graphs 64A-64E and 66A-66F at a point along the x-axis corresponding to a location along the length of the rail head surfaces 34A, 34B. The horizontal marker 68A and the vertical marker 68B both correspond to the same location along the length of the rail head surfaces 34A, 34B. This allows the user to easily view the defects within the rail head surface 34A, 34B of either rail 26A, 26B, and then determine the values of the rail properties and the calculated metrics related to those defects.

The user can interact with either of the visual markers 68A, 68B to move them to different locations on the rail head surfaces 34A, 34B. When the user or the system causes either visual marker 68A, 68B to be overlaid at a new location along the length of the rail head surfaces 34A, 34B, the other visual marker 68B, 68A can automatically be update such that it is overlaid at the same location. For example, while viewing all of the information displayed by the electronic display device 22, the user may notice a defect in the rail head surfaces 34A, 34B in image 60. By interacting with the horizontal marker 68A so that it is overlaid on the image 60 at or near the defect the user is interested in, the vertical marker 68B and/or the graphs 64A-64E and 66A-66F can move so that the vertical marker 68B is at or near the position along the x-axis corresponding to where the defect in the rail head surfaces 34A, 3B is. The vertical marker 68A will then show the user the properties of the rails 26A, 26B and the value of the calculated metrics where the defect is.

Similarly, if the user identifies any data points of interest in any of the graphs 64A-64E and 66A-66F, the user can interact with the vertical marker 68B and/or the graphs 64A-64E and 66A-66F until the vertical marker 68B is at or near the data points of interest. Following this, the horizontal marker 68A and/or the image 60 can automatically update so that the horizontal marker 68A is overlaid on the image 60 at or near the location along the length of the rail head surfaces 34A, 34B that gave rise to the data points of interest. Thus, the visual markers 68A, 68B allow the user to quickly link the qualitative characteristics of the rail head surfaces 34A, 34B (e.g., defects in the rail head surfaces 34A, 34B visible in the images) with the quantitative characteristics of the rail head surfaces 34A, 34B (e.g., the value of the positional characteristics and the calculated metrics).

In some implementations, the user can move the horizontal marker 68A to different locations along the rail head surfaces 34A, 34B while the rail head surfaces 34A, 34B remain stationary. In other implementations, the user can cause the rail head surfaces 34A, 34B to move while the horizontal marker 68A remains stationary. In still other implementations, both the horizontal marker 68A and the rail head surfaces 34A, 34B can move.

Similarly, in some implementations, the user can move the vertical marker 68B to different locations along the x-axis while the graphs 64A-64E and 66A-66F remain stationary. In other implementations, the user can cause the graphs 64A-64E and 66A-66F to move while the vertical marker 68B remains stationary. In still other implementations, both the vertical marker 68B and the graphs 64A-64E and 66A-66F can move.

The longitudinal length of the rail head surfaces 34A, 34B that is displayed in image 60 can be adjusted by the user. The length that is displayed in image 60 can generally range from only a part of a single discrete elongated portion, up to the entire length of the track that has been analyzed. Similarly, the longitudinal length represented by the x-axis of the graphs 64A-64E and 66A-66F is also adjustable by the user. The length represented by the x-axis of the graphs can have a similar range as the image 60, from only a part of a single discrete elongated portion, up to the entire length of the track that has been analyzed. In some implementations, the user can adjust the x-axis of each of the graphs individually such that the graphs may display data for different longitudinal lengths.

In some implementations, the electronic display device 22 is configured to automatically update the cross-sectional images 62A, 62B of the rails 26A, 26B. Thus, when the user causes the horizontal marker 68A to be overlaid at a new location along the length of the rail head surfaces 34A, 34B, the electronic display device 22 can automatically update the cross-sectional images 62A, 62B so that they show the profile of the rails 26A, 26B at the new location. Similarly, when the user causes the vertical marker 68B to intersect with the x-axis of the graphs 64A-64E and 66A-66F at a new point, the electronic display device 22 can automatically update the cross-sectional images 62A, 62B so that they show the profile of rails 26A, 26B at that location represented by the new point along the x-axis.

In some implementations, the user can continuously scroll along rail head surfaces 34A, 34B in image 60 to view other locations along the length of the rail head surfaces 34A, 34B. In other implementations, the image 60 can be advanced in increments from one elongated portion of the rail head surfaces 34A, 34B to the next elongated portion of the rail head surfaces 34A, 34B. Similarly, the user can control how much of the rail head surfaces 34A, 34B are shown in the image 60, and how much of the length of the rails 26A, 26B and the rail head surfaces 34A, 34B are represented in the graphs 64A-64E and 66A-66F.

Figure 6:
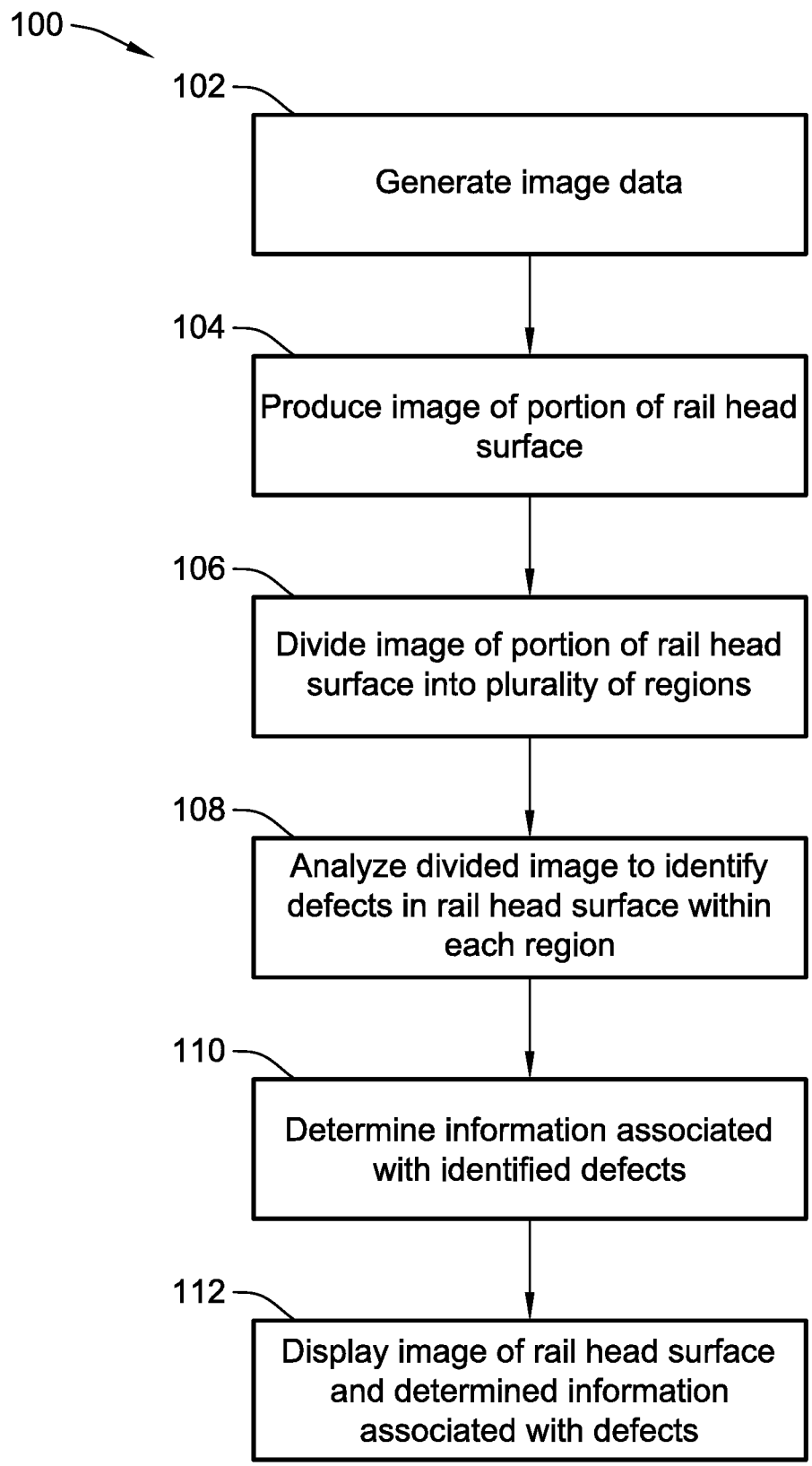
FIG. 6 is a flow diagram of a method for visualizing and analyzing a rail surface.

Referring now to FIG. 6, a method 100 for visualizing and quantifying surface damage on a railroad track is illustrated. At step 102, cameras disposed adjacent to the rails of the railroad track generate image data that is reproducible as one or more images of the rail head surfaces of the rails. Any number of cameras can be used to generate the image data. For tracks that have multiple rails, multiple cameras can be used to generate multiple sets of image data.

At step 104, an image of the rail head surface is produced from the generated image data. This image generally shows an elongated portion of the rail head surface of the one or more rails. An image of the same elongated portion of the rail head surface of each rail of the railroad track can be generated. At step 106, the image of the portion of the rail head surface of each image is divided into a plurality of regions. Generally, the rail head surface is divided along its width such that each region has a length equal to the length of the elongated portion of the rail head surface, and each region has a width less than the width of the rail head surface. However, one or more of the regions can overlap with other regions. For example, one of the regions can span the entire width of the rail head surface and overlap with all of the other regions. Other overlapping regions can have a width less than the width of the rail head surface and overlap with some or all of the remaining regions.

At step 108, the divided image of the rail head surface is analyzed to identify defects in the rail head surface within each of the regions. The defects could be cracks, pitting defects, or any other type of defects. Grinding marks can also be identified on the rail head surface. As noted herein, a defect identified in the surface of the rail does not require the rail to be repaired or replaced. At step 110, the system determines information associated with the identified defects. The determined information associated with the defects can include a number of metrics that quantify various properties of the defects in the rail head surface.

Each metric can be calculated for each individual region. Some metrics include the crack density, the average crack angle, the average crack width, the pitting density, the surface damage density, or a surface region index. These metrics serve to indicate the condition of the rail head surfaces.

At step 112, an electronic display device can display one or both of the image of the rail head surface and the information associated with the defects. The image of the rail head surface shows defects that the system has identified in the rail head surface. The image may show a single elongated portion of the rail head surface, or may show multiple elongated portions of the rail head surface. The displayed information can include graphs of the calculated metrics along the longitudinal length of the rail, as well as graphs of other information related to the rail. The electronic display device can include visual markers that link locations along the longitudinal length of the rail in the image with the value of the calculated metrics at or near the locations. The electronic display device can also display cross-sectional images of the rails.

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments described herein.

What is claimed is:

1. A system for visualizing and quantifying surface damage of a railroad track, the system comprising:
   a camera configured to be coupled to a transport device such that the camera is (i) disposed adjacent to a rail of the railroad track and (ii) configured to generate image data reproducible as an image of at least a portion of a surface of the rail, the transport device being configured to travel along the railroad track;
   an electronic display device;
   a memory device configured to receive and store therein the generated image data; and
   one or more processors configured to:
      produce, based on the image data, an image of the surface of the rail, the surface of the rail in the image including a plurality of elongated portions;
      analyze the image to identify one or more defects within each of the plurality of elongated portions of the surface of the rail, the identified one or more defects within each of the plurality of elongated portions of the surface of the rail including one or more cracks, pitting, or both and the at least one metric associated with the identified one or more defects within a first one of the plurality of elongated portions of the surface of the rail including a crack density of the identified one or more cracks, an average crack angle of the identified one or more cracks, an average crack width of the identified one or more cracks, a pitting density of the identified pitting, a surface damage density, a surface region index, or any combination thereof, wherein (i) the crack density of the identified one or more cracks is generally equal to a ratio of (a) a sum of an area of each of the identified one or more cracks within the first one of the plurality of elongated portions to (b) an area of the first one of the plurality of elongated portions, (ii) the average crack angle of the identified one or more cracks is generally equal to an average angle of the identified one or more cracks within the first one of the plurality of elongated portions with respect to a reference axis, (iii) the average crack width of the identified one or more cracks is generally equal to an average cross-sectional width of the identified one or more cracks within the first one of the plurality of elongated portions, (iv) the pitting density of the identified pitting is generally equal to a ratio of (a) a sum of an area of the identified pitting within the first one of the plurality of elongated portions to (b) an area of the first one of the plurality of elongated portions, (v) the surface damage density of the identified one or more defects is generally equal to a ratio of (i) a sum of an area of each of the identified one or more defects within the first one of the plurality of elongated portions to (ii) an area of the first one of the plurality of elongated portions, and (vi) the surface region index is generally equal to a weighted sum of at least two of the crack density, the average crack angle, the average crack width, the pitting density, or the surface damage density;
      determine a value of at least one metric for each of the plurality of elongated portions of the surface of the rail, the at least one metric being associated with the identified one or more defects within each of the plurality of elongated portions of the surface of the rail; and
      cause the electronic display device to display a graph indicative of the at least one metric for each of the plurality of elongated portions of the surface of the rail.

2. The system of claim 1, wherein the one or more processors are further configured to divide at least one of the plurality of elongated portions of the surface of the rail in the image into a plurality of regions along a width of the surface of the rail such that each of the plurality of regions in the image has a length generally equal to a length of the at least one elongated portion of the surface of the rail in the image.

3. The system of claim 1, wherein the one or more processors are further configured to cause the electronic display device to display a first visual marker and a second visual marker, wherein the first visual marker indicates a first location in the image along the surface of the rail, and wherein the second visual marker indicates the value of the at least one metric at a corresponding one of the plurality of elongated portions of the surface of the rail that includes the first location.

4. The system of claim 3, wherein movement of the first visual marker from the first location along the surface of the rail to a second location along the surface of the rail causes the second visual marker to indicate the value of the at least one metric at a corresponding one of the plurality of elongated portions of the surface of the rail that includes the second location.

5. The system of claim 3, wherein the at least one metric includes a first metric and a second metric different from the first metric, and wherein the second visual marker indicates the value of both the first metric and the second metric for one of the plurality of elongated portions of the surface of the first rail.

6. The system of claim 1, wherein the graph indicative of the at least one metric shows the value of the at least one metric along a length of the rail for each of the plurality of elongated portions of the surface of the rail.

7. A system for visualizing and quantifying surface damage of a railroad track, the system comprising:
- a first camera configured to be coupled to a transport device such that the first camera is (i) disposed adjacent to a first rail of the railroad track and (ii) configured to generate first image data reproducible as a first image of a portion of a surface of the first rail;
- a second camera configured to be coupled to the transport device such that the second camera is (i) disposed adjacent to a second rail of the railroad track and (ii) configured to generate second image data reproducible as a second image of a portion of a surface of the second rail;
- an electronic display device;
- a memory device configured to receive and store therein the generated first image data and the generated second image data; and
- one or more processors configured to:
  - divide the first image of the portion of the surface of the first rail into a first plurality of regions, the first plurality of regions of the first image including (i) a first region having a width less than a width of the portion of the surface of the first rail in the first image, (ii) a second region having a width less than the width of the portion of the surface of the first rail in the first image, and (iii) a third region having a width equal to the width of the portion of the surface of the first rail in the third image, the third region overlapping with both the first region and the second region, wherein a sum of the width of the first region and the width of the second region is equal to the width of the portion of the surface of the first rail;
  - divide the second image of the portion of the surface of the second rail into a second plurality of regions;
  - analyze the divided first image to identify, within each of the first plurality of regions, one or more defects in the portion of the surface of the first rail;
  - analyze the divided second image to identify, within each of the second plurality of regions, one or more defects in the portion of the surface of the second rail;
  - determine information associated with the identified one or more defects in the portion of the surface of the first rail and the identified one or more defects in the portion of the surface of the second rail; and
  - cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail.

8. The system of claim 7, wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof.

9. A system for visualizing and quantifying surface damage of a railroad track, the system comprising:
- a first camera configured to be coupled to a transport device such that the first camera is (i) disposed adjacent to a first rail of the railroad track and (ii) configured to generate first image data reproducible as a first image of a portion of a surface of the first rail;
- a second camera configured to be coupled to the transport device such that the second camera is (i) disposed adjacent to a second rail of the railroad track and (ii) configured to generate second image data reproducible as a second image of a portion of a surface of the second rail;
- an electronic display device;
- a memory device configured to receive and store therein the generated first image data and the generated second image data; and
- one or more processors configured to:
  - divide the first image of the portion of the surface of the first rail into a first plurality of regions;
  - divide the second image of the portion of the surface of the second rail into a second plurality of regions;
  - analyze the divided first image to identify, within each of the first plurality of regions, one or more defects in the portion of the surface of the first rail;
  - analyze the divided second image to identify, within each of the second plurality of regions, one or more defects in the portion of the surface of the second rail;
  - determine information associated with the identified one or more defects in the portion of the surface of the first rail and the identified one or more defects in the portion of the surface of the second rail; and
  - cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail,
- wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and
- wherein the crack density of the identified one or more cracks within a first region of the first plurality of regions or a second region of the second plurality of regions is generally equal to a ratio of (i) a sum of an area of each of the identified one or more cracks within the first region or the second region to (ii) an area of the first region or the second region.

10. A system for visualizing and quantifying surface damage of a railroad track, the system comprising:
- a first camera configured to be coupled to a transport device such that the first camera is (i) disposed adjacent to a first rail of the railroad track and (ii) configured to generate first image data reproducible as a first image of a portion of a surface of the first rail;
- a second camera configured to be coupled to the transport device such that the second camera is (i) disposed adjacent to a second rail of the railroad track and (ii) configured to generate second image data reproducible as a second image of a portion of a surface of the second rail;
- an electronic display device;
- a memory device configured to receive and store therein the generated first image data and the generated second image data; and
- one or more processors configured to:
  - divide the first image of the portion of the surface of the first rail into a first plurality of regions;
  - divide the second image of the portion of the surface of the second rail into a second plurality of regions;
  - analyze the divided first image to identify, within each of the first plurality of regions, one or more defects in the portion of the surface of the first rail;
  - analyze the divided second image to identify, within each of the second plurality of regions, one or more defects in the portion of the surface of the second rail;
  - determine information associated with the identified one or more defects in the portion of the surface of the first rail and the identified one or more defects in the portion of the surface of the second rail; and
  - cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail,
- wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and
- wherein the average crack angle of the identified one or more cracks within a first region of the first plurality of regions or a second region of the second plurality of regions is generally equal to an average angle of the identified one or more cracks within the first region with respect to a reference axis.

11. A system for visualizing and quantifying surface damage of a railroad track, the system comprising:
- a first camera configured to be coupled to a transport device such that the first camera is (i) disposed adjacent to a first rail of the railroad track and (ii) configured to generate first image data reproducible as a first image of a portion of a surface of the first rail;
- a second camera configured to be coupled to the transport device such that the second camera is (i) disposed adjacent to a second rail of the railroad track and (ii) configured to generate second image data reproducible as a second image of a portion of a surface of the second rail;
- an electronic display device;
- a memory device configured to receive and store therein the generated first image data and the generated second image data; and
- one or more processors configured to:
  - divide the first image of the portion of the surface of the first rail into a first plurality of regions;
  - divide the second image of the portion of the surface of the second rail into a second plurality of regions;
  - analyze the divided first image to identify, within each of the first plurality of regions, one or more defects in the portion of the surface of the first rail;
  - analyze the divided second image to identify, within each of the second plurality of regions, one or more defects in the portion of the surface of the second rail;
  - determine information associated with the identified one or more defects in the portion of the surface of the first rail and the identified one or more defects in the portion of the surface of the second rail; and
  - cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail,
- wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and
- wherein the average crack width of the identified one or more cracks within a first region of the first plurality of regions or a second region of the second plurality of regions is generally equal to an average cross-sectional width of the identified one or more cracks within the first region or the second region.

12. A system for visualizing and quantifying surface damage of a railroad track, the system comprising:
- a first camera configured to be coupled to a transport device such that the first camera is (i) disposed adjacent to a first rail of the railroad track and (ii) configured to generate first image data reproducible as a first image of a portion of a surface of the first rail;

a second camera configured to be coupled to the transport device such that the second camera is (i) disposed adjacent to a second rail of the railroad track and (ii) configured to generate second image data reproducible as a second image of a portion of a surface of the second rail;

an electronic display device;

a memory device configured to receive and store therein the generated first image data and the generated second image data; and one or more processors configured to:

divide the first image of the portion of the surface of the first rail into a first plurality of regions;

divide the second image of the portion of the surface of the second rail into a second plurality of regions;

analyze the divided first image to identify, within each of the first plurality of regions, one or more defects in the portion of the surface of the first rail;

analyze the divided second image to identify, within each of the second plurality of regions, one or more defects in the portion of the surface of the second rail;

determine information associated with the identified one or more defects in the portion of the surface of the first rail and the identified one or more defects in the portion of the surface of the second rail; and cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail, wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and wherein the pitting density of the identified pitting within a first region of the first plurality of regions or a second region of the second plurality of regions is generally equal to a ratio of (i) a sum of an area of the identified pitting within the first region or the second region to (ii) an area of the first region or the second region.

13. A system for visualizing and quantifying surface damage of a railroad track, the system comprising:

a first camera configured to be coupled to a transport device such that the first camera is (i) disposed adjacent to a first rail of the railroad track and (ii) configured to generate first image data reproducible as a first image of a portion of a surface of the first rail;

a second camera configured to be coupled to the transport device such that the second camera is (i) disposed adjacent to a second rail of the railroad track and (ii) configured to generate second image data reproducible as a second image of a portion of a surface of the second rail;

an electronic display device;

a memory device configured to receive and store therein the generated first image data and the generated second image data; and one or more processors configured to:

divide the first image of the portion of the surface of the first rail into a first plurality of regions;

divide the second image of the portion of the surface of the second rail into a second plurality of regions;

analyze the divided first image to identify, within each of the first plurality of regions, one or more defects in the portion of the surface of the first rail;

analyze the divided second image to identify, within each of the second plurality of regions, one or more defects in the portion of the surface of the second rail;

determine information associated with the identified one or more defects in the portion of the surface of the first rail and the identified one or more defects in the portion of the surface of the second rail; and cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail, wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and wherein the surface damage density of the identified one or more defects within a first region of the first plurality of regions or a second region of the second plurality of regions is generally equal to a ratio of (i) a sum of an area of each of the identified one or more defects within the first region or the second region to (ii) an area of the first region or the second region.

14. A system for visualizing and quantifying surface damage of a railroad track, the system comprising:

a first camera configured to be coupled to a transport device such that the first camera is (i) disposed adjacent to a first rail of the railroad track and (ii) configured to generate first image data reproducible as a first image of a portion of a surface of the first rail;

a second camera configured to be coupled to the transport device such that the second camera is (i) disposed adjacent to a second rail of the railroad track and (ii) configured to generate second image data reproducible as a second image of a portion of a surface of the second rail;

an electronic display device;
a memory device configured to receive and store therein the generated first image data and the generated second image data; and
one or more processors configured to:
divide the first image of the portion of the surface of the first rail into a first plurality of regions;
divide the second image of the portion of the surface of the second rail into a second plurality of regions;
analyze the divided first image to identify, within each of the first plurality of regions, one or more defects in the portion of the surface of the first rail;
analyze the divided second image to identify, within each of the second plurality of regions, one or more defects in the portion of the surface of the second rail;
determine information associated with the identified one or more defects in the portion of the surface of the first rail and the identified one or more defects in the portion of the surface of the second rail; and
cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail,
wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and
wherein the surface region index within a first region of the first plurality of regions or a second region of the second plurality of regions is generally equal to a weighted sum of at least two of the crack density within the first region or the second region, the average crack angle within the first region or the second region, the average crack width within the first region or the second region, the pitting density within the first region or the second region, or the surface damage density within the first region or the second region.

15. A system for visualizing and quantifying surface damage of a railroad track, the system comprising:
a first camera configured to be coupled to a transport device such that the first camera is (i) disposed adjacent to a first rail of the railroad track and (ii) configured to generate first image data reproducible as a first image of a portion of a surface of the first rail;
a second camera configured to be coupled to the transport device such that the second camera is (i) disposed adjacent to a second rail of the railroad track and (ii) configured to generate second image data reproducible as a second image of a portion of a surface of the second rail;
an electronic display device;
a memory device configured to receive and store therein the generated first image data and the generated second image data; and
one or more processors configured to:
divide the first image of the portion of the surface of the first rail into a first plurality of regions;
divide the second image of the portion of the surface of the second rail into a second plurality of regions;
analyze the divided first image to identify, within each of the first plurality of regions, one or more defects in the portion of the surface of the first rail;
analyze the divided second image to identify, within each of the second plurality of regions, one or more defects in the portion of the surface of the second rail;
determine information associated with the identified one or more defects in the portion of the surface of the first rail and the identified one or more defects in the portion of the surface of the second rail; and
cause the electronic display device to display (i) at least a portion of the first image, (ii) at least a portion of the second image, (iii) a first graph indicative of the determined information associated with the identified one or more defects in the portion of the surface of the first rail, and (iv) a second graph indicative of the determined information associated with the identified one or more defects in the portion of the surface of the second rail,
wherein the identified one or more defects in the portion of the surface of the first rail and the identified one or more defects in the portion of the surface of the second rail include one or more cracks, pitting, or both, and wherein the determined information associated with the identified one or more defects in the portion of the surface of the first rail and the determined information associated with the identified one or more defects in the portion of the surface of the second rail includes a crack density of the identified one or more cracks, an average crack angle of the identified one or more cracks, an average crack width of the identified one or more cracks, a pitting density of the identified pitting, a surface damage density, a surface region index, or any combination thereof, and
wherein the first plurality of regions includes (i) a first region having a width less than a width of the portion of the surface of the first rail, (ii) a second region having a width less than the width of the portion of the surface of the first rail, and (iii) a third region having a width equal to the width of the portion of the surface of the first rail, the third region overlapping with both the first region and the second region.

16. The system of claim 15, wherein the crack density of the identified one or more cracks within the first region is generally equal to a ratio of (i) a sum of an area of each of the identified one or more cracks within the first region to (ii) an area of the first region, wherein the crack density of the identified one or more cracks within the second region is generally equal to a ratio of (i) a sum of an area of each of the identified one or more cracks within the second region to (ii) an area of the second region, and wherein the crack density of the identified one or more cracks within the third region is generally equal to a ratio of (i) a sum of the area of each of the identified one or more cracks within both the first region and the second region to (ii) a sum of the area of the first region and the area of the second region.

17. The system of claim 15, wherein the average crack angle of the identified one or more cracks within the first region is generally equal to an average angle of the identified one or more cracks within the first region with respect to a reference axis, wherein the average crack angle of the identified one or more cracks within the second region is generally equal to an average angle of the identified one or more cracks within the second region with respect to the reference axis, and wherein the average crack angle of the identified one or more cracks within the third region is generally equal to an average angle of the identified one or more cracks within both the first region and the second region with respect to the reference axis.

18. The system of claim 15, wherein the average crack width of the identified one or more cracks within the first region is generally equal to an average cross-sectional width of the identified one or more cracks within the first region, wherein the average crack width of the identified one or more cracks within the second region is generally equal to an average cross-sectional width of the identified one or more cracks within the second region, and wherein the average crack width of the identified one or more cracks within the third region is generally equal to an average cross-sectional width of the identified one or more cracks within both the first region and the second region.

19. The system of claim 15, wherein the pitting density of the identified pitting within the first region is generally equal to a ratio of (i) a sum of an area of each identified pitting within the first region to (ii) an area of the first region, wherein the pitting density of the identified pitting within the second region is generally equal to a ratio of (i) a sum of an area of each of the identified pitting within the second region to (ii) an area of the second region, and wherein the pitting density of the identified pitting within the third region is generally equal to a ratio of (i) a sum of the area of each of the identified pitting within both the first region and the second region to (ii) a sum of the area of the first region and the area of the second region.

20. The system of claim 15, wherein the surface damage density of the identified one or more defects within the first region is generally equal to a ratio of (i) a sum of an area of each of the identified one or more defects within the first region to (ii) an area of the first region, and wherein the surface damage density of the identified one or more defects within the second region is generally equal to a ratio of (i) a sum of an area of each of the identified one or more defects within the second region to (ii) an area of the second region.

\* \* \* \* \*